United States Patent [19]

Mochizuki et al.

[11] Patent Number: 4,723,309

[45] Date of Patent: Feb. 2, 1988

[54] OPTICAL NETWORK SYSTEM OF BUS ARCHITECTURE CAPABLE OF RAPIDLY DETECTING COLLISION AT EACH COMMUNICATION STATION

[75] Inventors: Motomu Mochizuki; Souichirou Miyano; Kouji Aono; Shigeru Sho, all of Tokyo; Akio Abe, Iwate, all of Japan

[73] Assignee: NEC Corporation, Tokyo, Japan

[21] Appl. No.: 842,730

[22] Filed: Mar. 20, 1986

Related U.S. Application Data

[63] Continuation of Ser. No. 548,588, Nov. 3, 1983, abandoned.

[30] Foreign Application Priority Data

Nov. 5, 1982 [JP] Japan ................. 57-193321
Apr. 4, 1983 [JP] Japan ................. 58-58886
Apr. 4, 1983 [JP] Japan ................. 58-58885
Apr. 4, 1983 [JP] Japan ................. 58-49786[U]

[51] Int. Cl.$^4$ ............................................. H04B 9/00
[52] U.S. Cl. ................................. 455/601; 455/607; 455/612; 455/613
[58] Field of Search ............ 455/601, 606, 607, 609, 455/610, 612, 608, 613, 617, 618; 372/38; 370/85, 94, 86, 87, 88

[56] References Cited

U.S. PATENT DOCUMENTS

| | | | |
|---|---|---|---|
| 4,027,153 | 5/1977 | Kach | 455/607 |
| 4,345,250 | 8/1982 | Jacobsthal | 370/85 |
| 4,417,334 | 11/1983 | Gunderson et al. | 370/94 |
| 4,422,179 | 12/1983 | Albanese | 455/606 |
| 4,476,467 | 10/1984 | Terwilliger et al. | 370/94 |
| 4,568,931 | 2/1986 | Biolley et al. | 455/607 |

FOREIGN PATENT DOCUMENTS

57-154955 9/1982 Japan ................. 455/612

OTHER PUBLICATIONS

Haas et al.—High Current Optical Driver CKT—IBM Tech. Disclosure Bulletin—vol. 25, 190 3A, Aug. 1982, pp. 1059, 1060.

*Primary Examiner*—Joseph A. Orsino, Jr.
*Attorney, Agent, or Firm*—Sughrue, Minn, Zinn, Macpeak, and Seas

[57] ABSTRACT

In an optical network system comprising a plurality of communication stations (21) and a star coupler (22) common to the stations, a collision test signal is produced from a generator (50) included in a transmitter section (31) of each station to be sent to the star coupler prior to transmission of a data sequence and is directly returned from the star coupler to a receiver section (32) thereof. The receiver section comprises a detector (51) for monitoring the collision test signal to detect occurrence of collision. The detector makes the transmitter section intercept the data sequence on occurrence of the collision. Preferably, the collision test signal is encoded by an encoder (37) in the transmitter section to be combined with a snychronizing signal and is decoded by a decoder (42) in the receiver section. Such stations may be coupled to the star coupler through a concentrator and a distributor or may be divided into a plurality of groups each of which is accommodated in a network unit linked through a repeater to the other in a loop.

4 Claims, 18 Drawing Figures

OPTICAL NETWORK SYSTEM OF BUS ARCHITECTURE CAPABLE OF RAPIDLY DETECTING COLLISION AT EACH COMMUNICATION STATION

This is a continuation of application Ser. No. 548,588, filed Nov. 3, 1983, now abandoned.

BACKGROUND OF THE INVENTION

This invention relates to an optical network system for use in carrying out optical communication among a plurality of communication stations.

A conventional optical network system of the type described comprises a star coupler for optically coupling communication stations in common through optical fibers. The star coupler serves to distribute, to all of the communication stations, each optical signal train given from the communication stations and is, therefore, operable as a common transmission path. This means that such a system forms a logical bus architecture, as called in the art.

The optical network system is advantageous as compared with a coaxial cable network system because the optical network system is not subjected to any electrical troubles, such as electro-magnetic induction, and enables high speed and long-distance transmission.

Each communication station is usually connected to a terminal unit or units, such as a facsimile system, a personal computer, and any other intelligent terminal. Inasmuch as each terminal unit carries out communication at random independent of the other terminal units, such communication is often concurrently carried out in at least two terminal units. Concurrent communication inevitably gives rise to collision in the network system of the above-mentioned architecture. Such collision should rapidly be detected and removed. However, a long time has been necessary to detect the collision when a distance becomes long between the communication stations because a transmission delay of the optical signal train increases as the distance is lengthened.

Inasmuch as the star coupler has input and output terminals each of which is equal to a predetermined number and can only accommodate the communication stations to the predetermined number at most, the conventional optical network system is restricted in the number of the communication stations to be connected to the star coupler.

SUMMARY OF THE INVENTION

It is an object of this invention to provide an optical network system of a logical bus architecture type, which is capable of rapidly detecting collision of communications to effectively utilize the network system.

It is another object of this invention to provide an optical network system of the type described, which is capable of readily increasing the number of communication stations and terminal units which are to be coupled to one another.

A network system to which this invention is applicable is for use in optical transmission among a plurality of communication stations through a star coupler operable as a common transmission path. The star coupler is given first optical signal trains generated by the respective communication stations so as to distribute each of the first optical signal trains to all of the stations as second optical signal trains and to make predetermined at least one of the other stations receive one of the second optical signal trains. Each of the first optical signal trains gives rise to collision with another on concurrent transmission of the first optical signal trains. According to this invention, each of the communication stations comprises signal producing means for electrically producing a sequence of transmission signals including a specific data signal, sending means for sending the transmission signal sequence to the star coupler as one of the first optical signal trains to make the star coupler deliver the specific data signal to the each communication station as a particular one of the second optical signal trains, reproducing means responsive to the particular second optical signal train for electrically reproducing the transmission signal sequence into a reproduced signal sequence including a reproduction of the specific data signal as received specific data signal, and collision detecting means for detecting occurrence of the collision by comparing the specific data signal with the received specific data signal.

DESCRIPTION OF THE PREFERRED EMBODIMENTS

Figure 1:
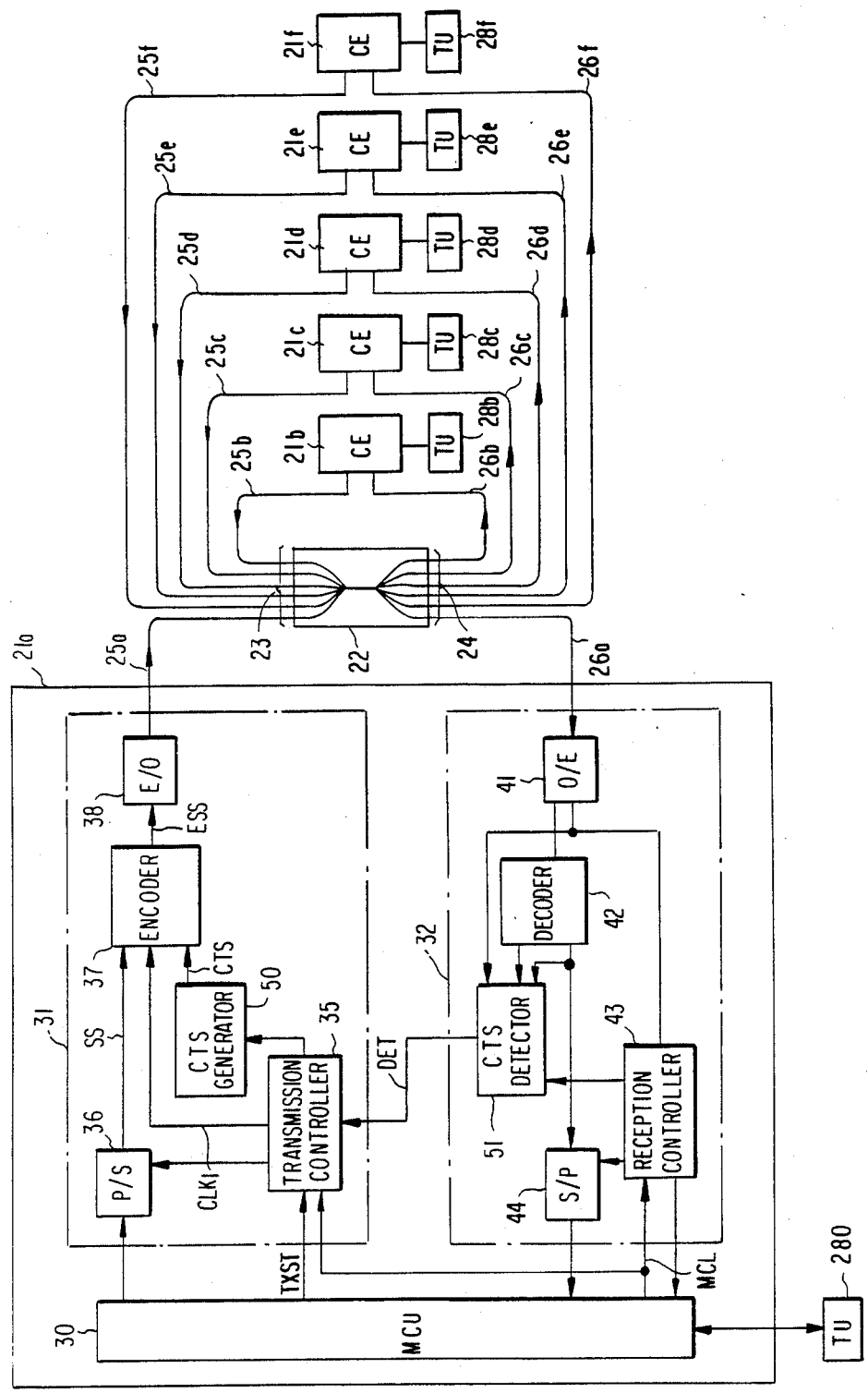
FIG. 1 shows a block diagram of an optical network system according to a first embodiment of this invention with only a part illustrated in detail.

Referring to FIG. 1, an optical network system according to a first embodiment of this invention comprises six communication stations or equipments (abbreviated to CE) 21a-21f and a single star coupler 22 of a passive type operable as a common transmission path as will become clear later. The star coupler 22 has six terminals of a first set 23 and six terminals of a second set 24. The respective communication stations 21a-21f are connected through transmission optical fiber cables 25a-25f to the first-set terminals 23 of the star coupler 22 and through reception optical fiber cables 26a-26f to the second-set terminals 24. The communication stations 21 (affixes omitted) transmit first optical signal trains through the transmission optical fiber cables 25, respectively, and receive second optical signal trains through the star coupler 22 and the reception optical fiber cables, respectively, in a manner to be described.

It is apparent from FIG. 1 that the communication stations 21 are physically connected to the star coupler 22 in a starlike fashion. Therefore, the illustrated system may be called a star connected system.

It should be noted here that the star coupler 22 serves to distribute each of the first optical signal trains given from each communication station to all of the communication stations 21a-21f through the second-set terminals 24 as the second optical signal trains and is therefore logically operable as the common transmission path, namely, a bus. Thus, the illustrated system has a logical bus architecture. The second optical signal trains are received at predetermined at least one of the communication stations 21a-21f.

The communication stations 21 accommodate terminal units 28a-28f, such as facsimile equipments, personal computers, or any other intelligent terminals. If a protocol converting system is accommodated as either one of the terminal units 28a to 28f, any other network system can be connected to the illustrated network system to form a hierarchy system. A plurality of terminal units may be connected to each communication station, although a single terminal unit alone is represented in FIG. 1.

Description will be made in detail hereinunder about the communication station 21a alone by way of example because the remaining stations 21b to 21f are similar in structure and operation to the communication station 21a. In FIG. 1, the communication station 21a comprises a main control unit (MCU) 30 coupled to the terminal unit 28a, a transmitter section 31 for transmitting the first optical signal train to the transmission optical fiber cable 25a, and a receiver section 32 for receiving a particular one of the second optical signal trains through the reception optical fiber cable 26a.

Let a succession of transmission signals be supplied from the terminal unit 28a to the main control unit 30. The transmission signal sequence comprises a destination address signal for specifying one of the stations 21a-21f as a destination station and a transmission data series to be sent to the destination station. The main control unit 30 produces a start signal TXST to energize the transmitter section 31. The transmission signal sequence is successively sent from the main control unit 30 to the transmitter section 31 in a bit parallel fashion as a parallel transmission signal of, for example, 8 bits.

The transmitter section 31 comprises a transmission controller 35 responsive to the start signal TXST for putting the transmitter section 31 into an enabled state and a parallel-to-serial (P/S) conversion circuit 36 to which the parallel transmission signal is delivered. The parallel-to-serial conversion circuit 36 supplies an encoder 37 with a serial transmission bit sequence SS under control of the transmission controller 35. On parallel-to-serial conversion, a synchronizing signal SYNC and an address assigned to the communication station 21a are produced to be included in the serial transmission bit sequence. The encoder 37 is also supplied with a sequence of first clock pulses $CLK_1$ in synchronism with the serial transmission bit sequence SS and carries out coded mark inversion (CMI) on the serial transmission bit sequence in accordance with the clock pulse sequence $CLK_1$ in a known manner to produce an encoded signal sequence ESS. The clock pulse sequence $CLK_1$ is produced with reference to a main clock pulse MCL supplied from the main control unit 30. The encoded signal sequence ESS is converted into the first optical signal train by an electro-opto (E/O) converter 38 to be sent to the transmission optical fiber cable 25a. The first optical signal sequence is transmitted through the star coupler 22 to all of the communication stations 21a to 21f as the second optical signal sequences and received only at the destination station specified by the destination address.

As known in the art, the destination station sends an acknowledge character back to the communication station 21a when normal reception is carried out. Otherwise, the destination station sends a negative acknowledge character back to the communication station 21a.

On the other hand, let a particular one of the second optical signal sequences be received at the receiver section 32 of the communication station 21a through the receiption optical fiber cable 26a. The particular second optical signal sequence is converted into an electric signal sequence by an electro-opto (E/O) converter 41. The electric signal sequence is delivered to a decoder 42 and a reception controller 43. The decoder 42 decodes the electric signal sequence into a decoded signal sequence to supply the decoded signal to a serial-to-parallel (S/P) converter 44. The reception controller 43 derives the destination address from the electric signal sequence to make the serial-to-parallel converter 44 deliver a parallel signal to the main control unit 30 when the destination address specifies a station address assigned to the communication station 21a. The parallel signal is sent from the main control unit 30 to the terminal unit 28a.

It is assumed that the communication station 21a produces the first optical signal train simultaneously with the remaining one or ones of the communication stations 21b to 21f. In this event, collision inevitably takes place in the network system because the star coupler 22 is operable as the common transmission path. It is preferable that such collision is rapidly detected and removed by each of the communication stations 21a to 21f.

For this purpose, the transmitter section 31 comprises a collision test signal (CTS) generator 50 for generating a collision test signal CTS having a specific pattern. The receiver section 32 comprises a collision test signal detector 51 for detecting occurrence of collision by comparing the specific pattern with a received pattern given by a received collision test signal resulting from the collision test signal CTS. The collision test signal CTS has to be returned back to the communication station 21a as long as no collision takes place. Therefore, it is possible to detect occurrence of the collision by monitoring the collision test signal CTS and the received collision test signal. Inasmuch as the collision test signal is received at the receiver section 32 before reception of the acknowledge character returned from the destination station, it is possible to shorten a time interval between transmission of the collision test signal CTS and reception thereof.

Figure 2:
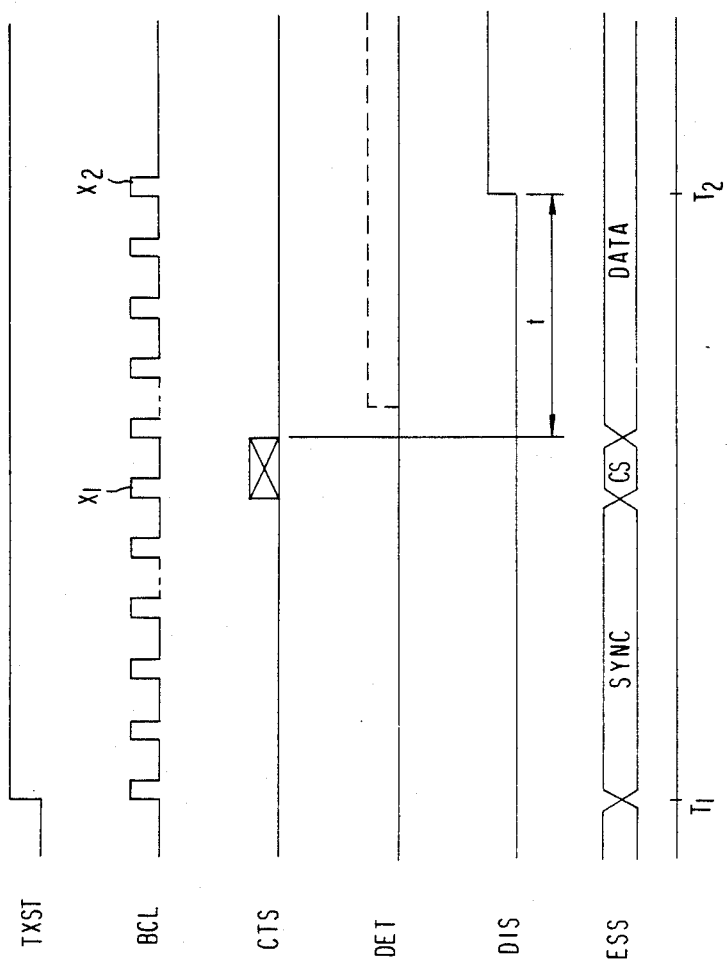
FIG. 2 shows a time chart for schematically describing operation of the optical network system illustrated in FIG. 1.

Referring to FIG. 2 afresh and FIG. 1 again, the transmitter section 31 is energized at a time instant $T_1$ by the start signal TXST supplied from the main control unit 30. Responsive to the start signal TXST, the transmission controller 35 makes the parallel-to-serial conversion circuit 36 produce the synchronizing signal SYNC. As a result, the encoded signal sequence ESS carries the synchronizing signal SYNC. A sequence of byte clock pulses BCL (FIG. 2) is produced in the transmission controller 35 each time when the clock pulses $CLK_1$ are counted to eight. Inasmuch as the clock pulses $CLK_1$ are synchronized with each bit of the serial transmission bit sequence SS, each byte clock pulse BCL appears each time when each byte of the serial transmission bit sequence SS is produced by the parallel-to-serial conversion circuit 36. Accordingly, each byte clock pulses BCL serves to specify each byte of the serial transmission bit sequence SS. Let the collision test signal CTS be produced by the collision test signal generator 50 under control of the transmission controller 35 when the byte clock pulses BCL are counted to a first count $X_1$.

When the byte clock pulses BCL are counted to the first count $X_1$, the collision test signal generator 50 is energized by the transmission timing controller 35 to produce the collision test signal CTS lasting a duration between two adjacent ones of the byte clock pulses BCL. The collision test signal CTS is combined with the synchronizing signal SYNC in the encoder 37 to be encoded into a composite signal CS, depicted in the encoded signal sequence ESS.

The composite signal CS is followed by the transmission data encoded by the encoder 37, as indicated at DATA in FIG. 2, and is sent as the first optical signal sequence to the star coupler 22.

The first optical signal sequence is delivered to the receiver section 32 as the particular second optical signal sequence through the star coupler 22. The electric signal sequence which is converted or reproduced by the opto-to-electro conversion circuit 41 is sent to the decoder 42 to be separated into a composite signal portion (CS) and a data signal portion (DATA).

When the collision test signal CTS arrives at the collision test signal detector 51 as the received collision test signal, the detector 51 supplies a detection signal DET to the transmission controller 35 under control of the reception controller 43, as illustrated at a broken line in FIG. 2. Otherwise, the detector 51 produces no detection signal, as shown at a solid line in FIG. 2.

The transmission controller 35 is still counting the byte clock pulses BCL. When the byte clock pulses BCL are counted to a second count $X_2$, the transmission controller 35 is disabled to stop transmitting the serial transmission bit sequence SS at a second time instant $T_2$, as shown at a solid line in DIS of FIG. 2. On the other hand, when the detection signal DET appears, as shown at the broken line in DET of FIG. 2, no disable signal is produced in the transmission controller 35, as shown at the broken line in DET of FIG. 2. Therefore, the transmitter section 31 continues to transmit the serial transmission bit sequence SS.

From this fact, it is readily understood that the transmission controller 35 measures a preselected time interval t after production of the collision test signal CTS and that the transmitter section 31 is disabled when no detection signal DET is received at the receiver section 32 within the preselected time interval t. In other words, arrival of the collision test signal CTS within the preselected duration t is regarded as absence of the collision in the communication station 21a while arrival of no collision test signal CTS is regarded as occurrence of the collision.

Detailed description will be directed to the main control unit 30, the transmitter section 31, and the receiver section 32 hereinafter.

Figure 3:
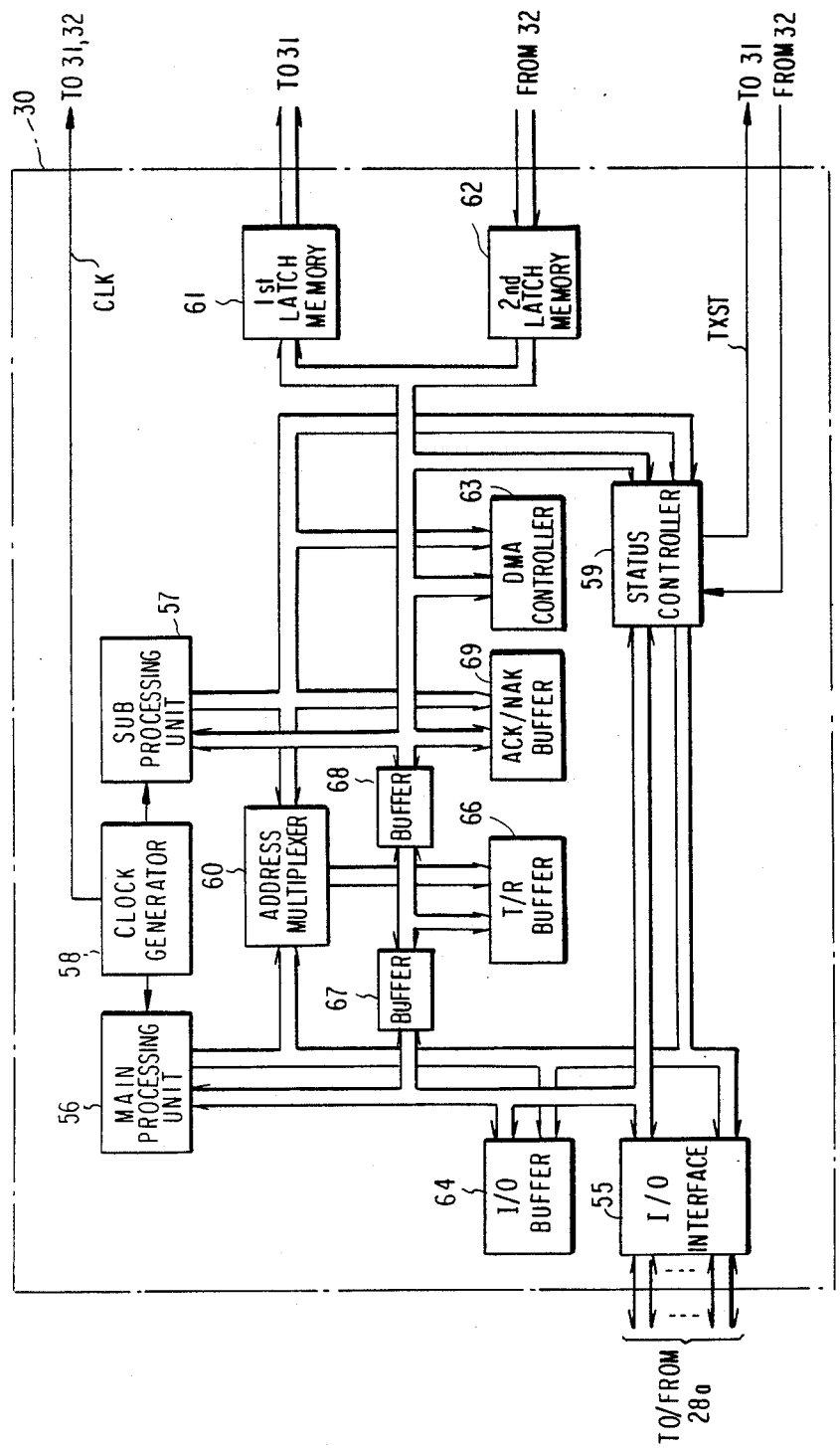
FIG. 3 shows a block diagram of a main control unit for use in the optical network system illustrated in FIG. 1.

Referring to FIG. 3 together with FIG. 1, the main control section 30 comprises an I/O interface 55 connected to the terminal unit or units 28a, a main processing unit 56, and a subsidiary processing unit 57. The main processing unit 56 carries out operation in relation to the terminal unit 28a while the subsidiary processing unit 57 is operated in relation to the transmitter and the receiver sections 31 and 32. Both of the main and the subsidiary processing units 56 and 57 are synchronized with each other by a sequence of unit clock pulses delivered from a clock generator 58. The clock generator 58 also delivers the main clock pulse sequence MCL (shown in FIG. 1) to the transmitter and the receiver sections 31 and 32. A status controller 59 is coupled to the main and the subsidiary processing units 56 and 57 and to the transmitter and the receiver sections 31 and 32 so as to control all of them. An address multiplexer 60 is coupled to the main and the subsidiary processing units 56 and 57 to selectively transfer each address signal supplied from the unit 56 or 57. First and second latch memories 61 and 62 are connected to the transmitter and the receiver sections 31 and 32, respectively, and are controlled by a direct memory access (DMA) controller 63. The direct memory access controller 63 is operable to access each of the first and the second latch memories 61 and 62 under control of the subsidiary processing unit 57 in a direct memory access fashion known in the art. Any other elements included in the main control unit 30 will become clear as description proceeds.

The transmission signal succession which is supplied from the terminal unit 28a is stored in an I/O buffer 63 through the I/O interface 55 under control of the main processing unit 56. As mentioned before, the transmission signal succession is accompanied by the destination address.

The main processing unit 56 makes the I/O buffer 64 transfer the stored signal succession to a transmission/-reception (abbreviated to T/R) buffer 66 through a first additional buffer 67, if a memorizable area remains in the T/R buffer 66.

Subsequently, the subsidiary processing unit 57 is put into operation to energize the transmitter section 31 (FIG. 1) through the status controller 59 by producing the start signal (TXST), provided that the receiver section 32 (FIG. 1) is deenergized. A transmission request is sent from the transmitter section 31 through the status controller 59 to the direct memory access controller 63. Responsive to the transmission request, the direct memory access controller 63 makes the T/R buffer 66 transfer the memorized transfer signal succession to the transmitter section 31 through a second additional buffer 68 and the first latch memory 61. The transferred transmission signal succession is transmitted from the transmitter section 31 to the transmission optical fiber cable 25a as the first optical signal train, as will later be described.

When the first optical signal train is normally received by the destination station, the acknowledge character is returned back to the communication station 21a in the form of an acknowledge (ACK) packet. Otherwise, the negative acknowledge character is returned back from the destination station to the communication station 21a in the form of a negative acknowledge (NAK) packet.

The acknowledge or the negative acknowledge packet is stored in the second latch memory 62 through the receiver section 32 and, thereafter, transferred from the second latch memory 62 to an ACK/NAK buffer 69 under control of the DMA controller 63 in the direct memory access fashion. After reception of the acknowledge or the negative acknowledge packet, usual operation is carried out by the status controller 59 in a well-known manner.

Let the reception signal succession be delivered as a reception packet through the receiver section 32 (FIG. 1) to the second latch memory 62 in a manner to be described. In this event, the reception packet is transferred from the second latch memory 62 to the T/R buffer 66 through the second additional buffer 68 under control of the direct memory access controller 62. Thereafter, the main processing unit 56 makes the T/R buffer 66 send the reception packet to the terminal unit 28a through the I/O buffer 64 and the I/O interface 55.

Figure 4:
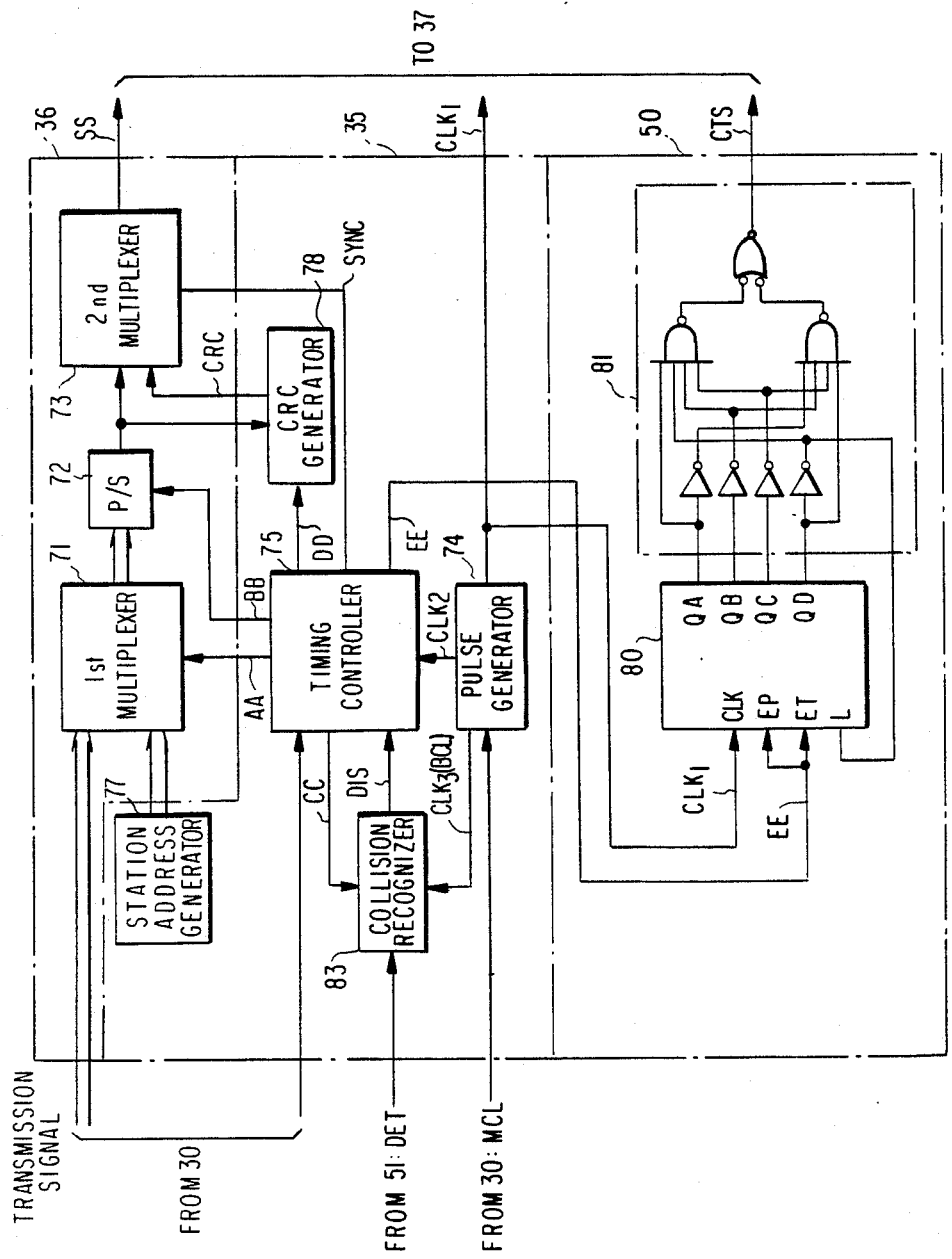
FIG. 4 shows a block diagram of a transmitter section for use in the optical network system illustrated in FIG. 1.

Referring to FIG. 4 together with FIGS. 1 and 2, the transmission signal succession is transferred from the first latch memory 61 (FIG. 3) in a bit parallel fashion to the parallel-to-serial (P/S) conversion circuit 36 as a parallel transmission signal of, for example, 8 bits. The parallel transmission signal is sent as the serial transmission signal SS through the parallel-to-serial conversion circuit 36. To this end, the parallel-to-serial conversion circuit 36 comprises a first multiplexer 71, a parallel-to-serial (P/S) converter 72, and a second multiplexer 73, which cooperate with the transmission controller in a manner described below.

As shown in FIG. 4, the transmission controller 35 comprises a pulse generator 74 responsive to the main clock pulse sequence MCL for generating sequences of first, second, and third clock pulses $CLK_1$, $CLK_2$, and $CK_3$. The third clock pulse sequence $CLK_3$ is produced each time when the first clock $CLK_1$ is counted to eight and may therefore be called the byte clock pulses BCL as described in conjunction with FIG. 2. The second clock pulse sequence $CLK_2$ has a repetition frequency equal to the first clock pulse sequence $CLK_1$ is sent to a timing controller 75. The timing controller 75 is energized by the start signal TXST to supply first and second timing pulses AA and BB to the first multiplexer 71 and the parallel-to-serial converter 72, respectively. The timing controller 75 delivers the synchronizing signal SYNC to the second multiplexer 73. The timing controller 75 further produces third, fourth, and fifth timing pulses CC, DD, and EE to be described later. The third timing pulse CC is produced in response to the start signal TXST.

The transmission controller 35 further comprises a station address generator 77 for supplying the first multiplexer 71 with a station address signal which specifies a station address assigned to the communication station 21a under consideration. The assigned station address signal is given to the parallel-to-serial converter 72 through the first multiplexer 71 in accordance with the timing pulse sequence AA.

The parallel-to-serial converter 72 converts a combination of the assigned station address signal, the destination address signal, and the parallel transmission signal into an intermediate serial signal with reference to the second timing pulse sequence BB.

The intermediate serial signal is also supplied to the second multiplexer 73 and a cyclic redundancy check (CRC) code generator 78 operable in response to the fourth timing pulses DD. The CRC code generator 78 generates a cyclic redundancy check code signal CRC in response to the intermediate serial signal. Responsive to the synchronizing signal SYNC given from the timing controller 75, the second multiplexer 73 produces a combination of the synchronizing signal SYNC, the intermediate serial signal, and the cyclic redundancy check code signal CRC as the serial transmission signal SS.

Figure 5:
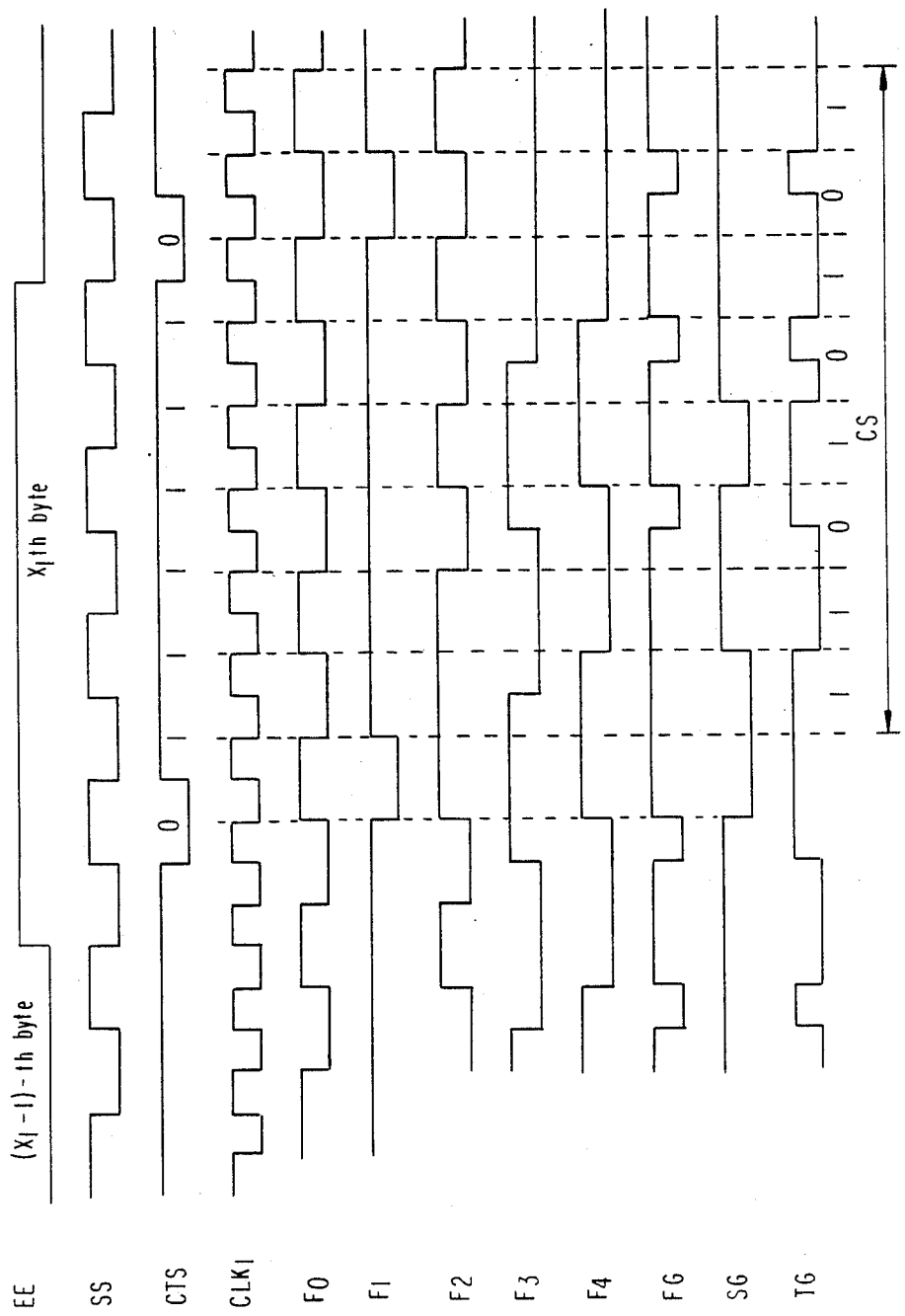
FIG. 5 shows a time chart for use in describing operation of the transmitter section illustrated in FIG. 4.

Temporarily referring to FIG. 5 together with FIG. 4, the timing controller 75 produces the fifth timing pulse EE specifying an $X_1$-th byte given by the first count $X_1$ described in conjunction with FIG. 2. The fifth timing pulse EE lasts the predetermined duration equal to a single byte duration, as mentioned with reference to the collision test signal CTS in FIG. 2. The fifth timing pulse EE is sent to the collision test signal generator 50 along with the first clock pulse sequence $CLK_1$ supplied from the pulse generator 74.

In FIG. 4, the collision test signal generator 50 comprises a counter 80 for successively counting the first clock pulses $CLK_1$ during presence of the fifth timing pulse EE to produce four bits of first, second, third, and fourth output signals $Q_A$, $Q_B$, $Q_C$, and $Q_D$, respectively. Therefore, the counter 80 can count the first clock pulses $CLK_1$ from "0000" to "1111." Responsive to the first through the fourth output signals $Q_A$ to $Q_D$, a logic circuit 81 produces a logic "1" level only when the first through the fourth output signals $Q_A$ to $Q_D$ take a first predetermined pattern of "0001" or a second predetermined pattern of "1000." Accordingly, the collision test signal generator 50 produces as the collision test signal CTS a specific pattern of "01111110" during presence of the fifth timing pulse EE, as illustrated in FIG. 5.

Figure 6:
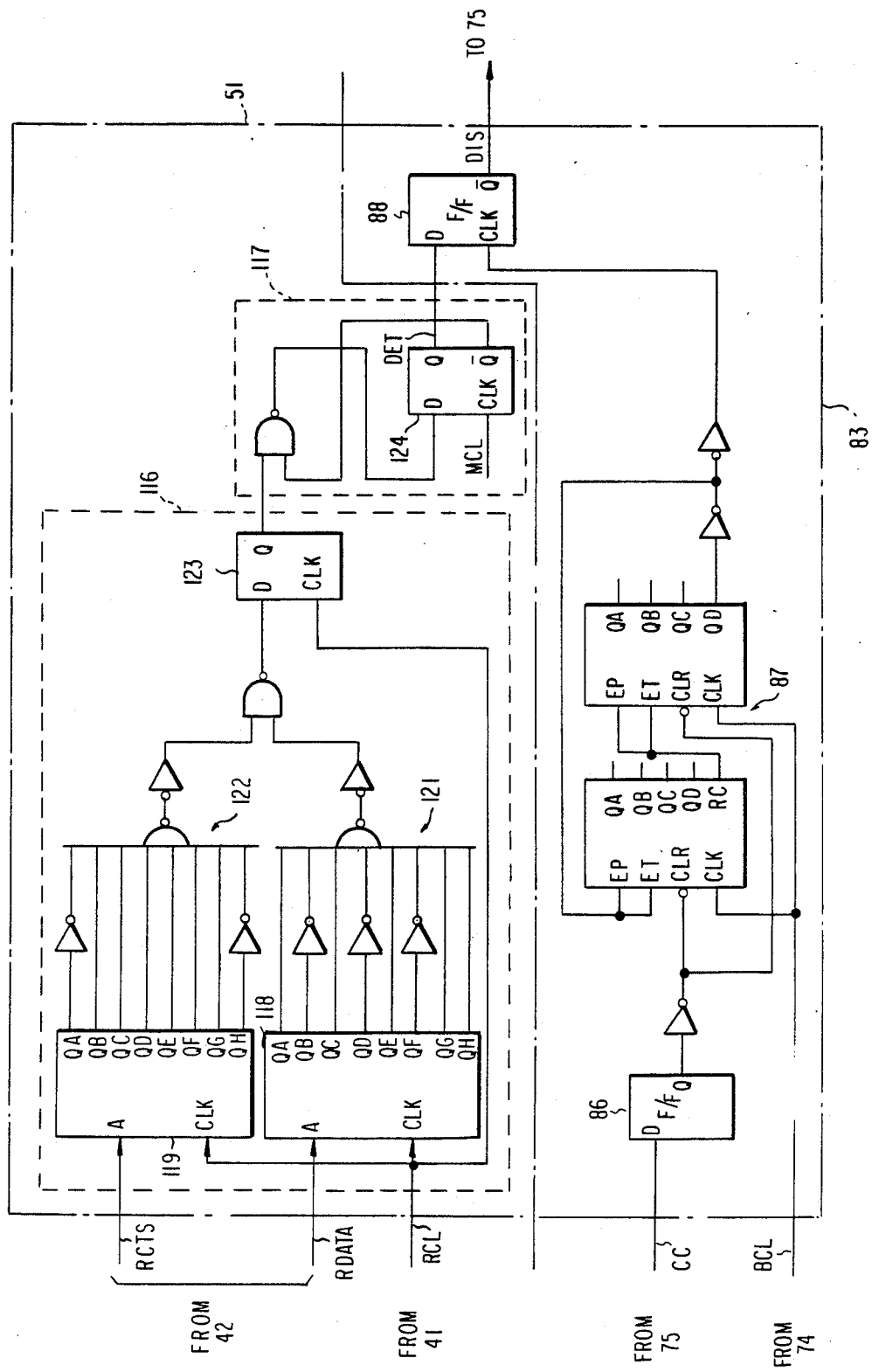
FIG. 6 shows a block diagram for use in describing a part of the transmitter section illustrated in FIG. 4 and a part of a received section illustrated in FIG. 1.

Referring to FIG. 6 afresh and FIG. 4 again, the third timing pulse CC which is produced in response to the start signal TXST is supplied from the timing controller 75 to a collision recognizer 83. The collision recognizer 83 is energized by the third timing pulse CC to count the third clock pulses $CLK_3$, namely, the byte clock pulses BCL. When the detection signal DET is supplied from the collision text signal detector 51 (FIG. 1) to the collision recognizer 83 before the byte clock pulses BCL are counted to the second count $X_2$, the collision recognizer 83 produces no disable signal. As a result, the transmission signal succession is successively transmitted without any interruption under control of the timing controller 75. Otherwise, the collision recognizer 83 produces the disable signal DIS indicated at the solid line in FIG. 2. Supplied with the disable signal DIS, the timing controller 75 is put into a disabled state to stop transmitting the serial transmission signal SS.

To this end, the collision recognizer 83 comprises a first flip flop 86 put in a set state in response to the third timing pulse CC, as illustrated in FIG. 6. When the first flip flop 86 is set, a counter portion 87 is enabled through an inverter to count the byte clock pulses BCL to a prescribed count. The prescribed count is equal to 128 in the illustrated example. As readily understood from FIG. 6, the counter portion 87 comprises a cascade connection of first and second partial counters which count the byte clock pulses to 16 and 8, respectively. Anyway, the counter portion 87 supplies a clock pulse to a second flip flop 88 when the byte clock BCL is counted to 128. The second flip flop 88 is kept in a reset state. When no detection signal is given to the second flip flop 88 from the collision test signal detector 51 (also in FIG. 1), the logic "1" level signal is sent as the disable signal DIS from a negative output terminal $\bar{Q}$ to the timing controller 75 (FIG. 4). On the other hand, when the detection signal DET is given from the collision test signal detector 51, the second flip flop 88 is put into a set state and therefore produces no disable signal.

Figure 7:
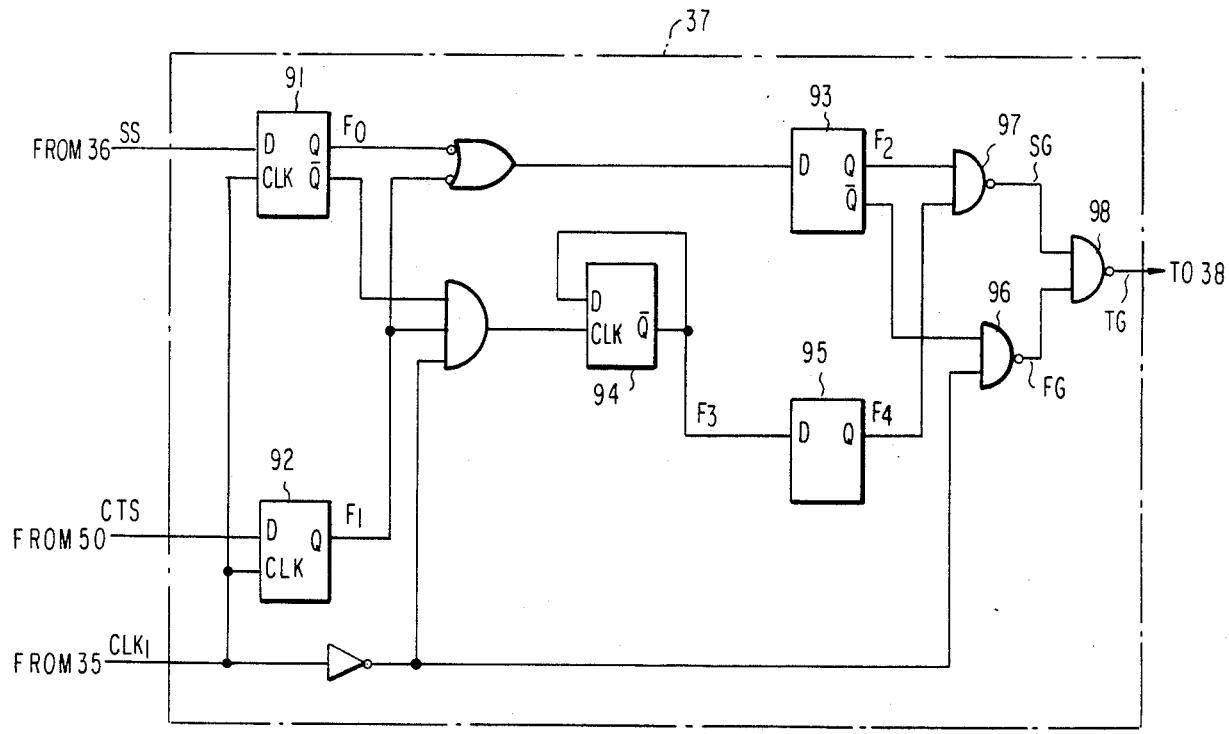
FIG. 7 shows a block diagram of an encoder for use in the transmitter section illustrated in FIG. 1.

Referring to FIG. 7 afresh together with FIGS. 1 and 5, the encoder 37 comprises first, second, third, fourth, and fifth encoder flip flops 91, 92, 93, 94, and 95. Responsive to the serial transmission signal SS, the first encoder flip flop 91 produces a first output signal $F_0$ in timed relation to the first clock pulse sequence $CLK_1$. While the collision test signal CTS is sent through the encoder 37, the encoder 37 produces the synchronizing signal SYNC, as illustrated at ESS in FIG. 2. The synchronizing signal SYNC is specified by an iterative pattern of "1" and "0" as shown at EE in FIG. 5. Under the circumstances, the first encoder flip flop 91 gives the serial transmission signal SS a delay equal to a single clock of the first clock pulse sequence $CLK_1$. The first output signal $F_0$ becomes as shown at $F_0$ in FIG. 5.

Likewise, the second encoder flip flop 92 produces a second output signal $F_1$ by delaying the collision test signal CTS in accordance with the first clock pulse sequence $CLK_1$, as illustrated at $F_1$ in FIG. 5.

The third encoder flip flop 93 is supplied with the first and the second output signals $F_0$ and $F_1$ through a gate to produce a third output signal $F_2$ as shown at $F_2$ in FIG. 5. The fourth encoder flip flop 94 is given the second output signal $F_1$, a negative output signal relative to the first output signal $F_0$, and an inversion of the first clock pulse sequence $CLK_1$ through an AND gate (unnumbered) to produce a fourth output signal $F_3$ as depicted at $F_3$ in FIG. 5. The fifth encoder flip flop 95 delays the fourth output signal $F_3$ to produce a fifth output signal $F_4$ as shown at $F_4$ in FIG. 7. A first NAND gate 96 produces a first gate signal FG in response to the inverted first clock pulse sequence and a negative output signal produced by the third encoder flip flop 93 relative to the third output signal $F_2$, while a second NAND gate 97 produces a second gate signal SG in response to the third and the fifth output signals $F_2$ and $F_4$, as shown in FIG. 7. The first and the second gate signals FG and SG are sent through a third NAND gate 98 as a third gate signal TG. The third gate signal TG is produced as the composite signal CS and has a pattern of "11010101," as shown in FIG. 5. As understood from the illustrated composite signal CS, the encoder 37 carries out the coded mark inversion. Thus, the collision test signal CTS is combined in the encoder with the synchronizing signal SYNC in the above-mentioned manner.

The composite signal CS is sent through the electro-opto converter 38 (FIG. 1) to the transmission optical fiber cable 25a as the first optical signal train.

From the above, it is readily understood that a combination of the parallel-to-serial conversion circuit 36, the transmission controller 35, the collision test signal generator 50, and the encoder 37 is operable to electrically produce an encoded transmission signal sequence including the collision test signal CTS, namely, a specific signal. The electro-opto converter 38 serves to send the transmission signal sequence as the first optical signal train.

Figure 8:
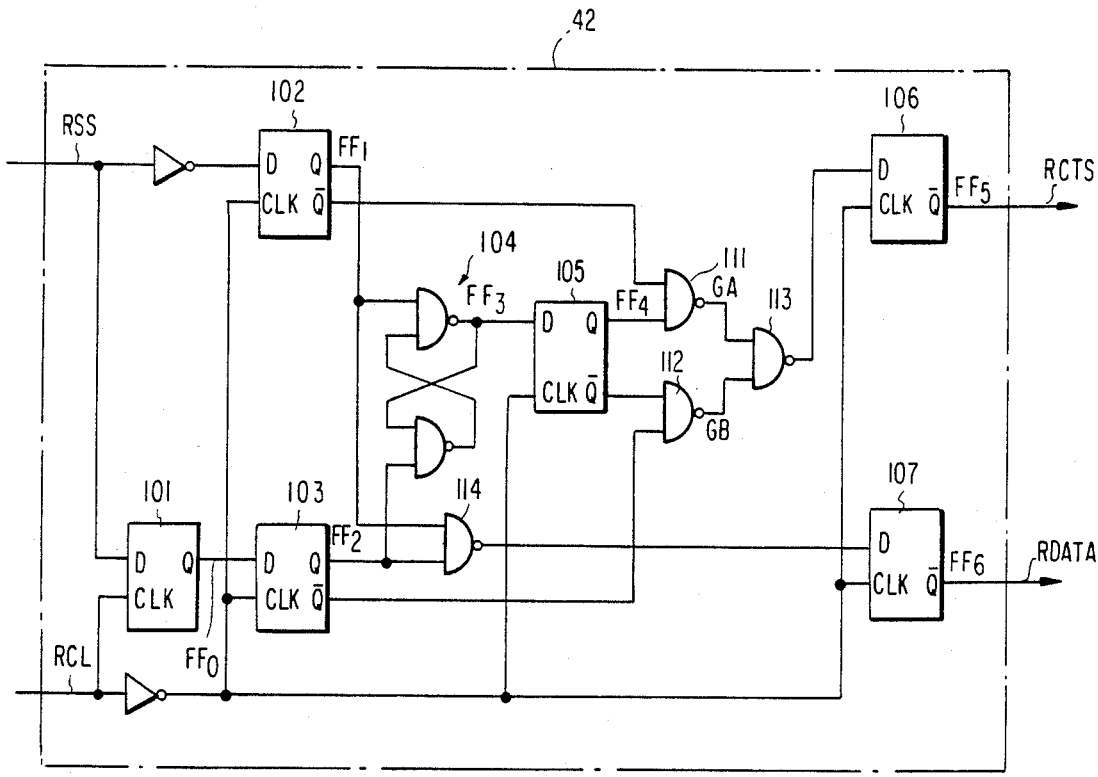
FIG. 8 shows a block diagram of a decoder for use in the receiver section illustrated in FIG. 1.
Figure 9:
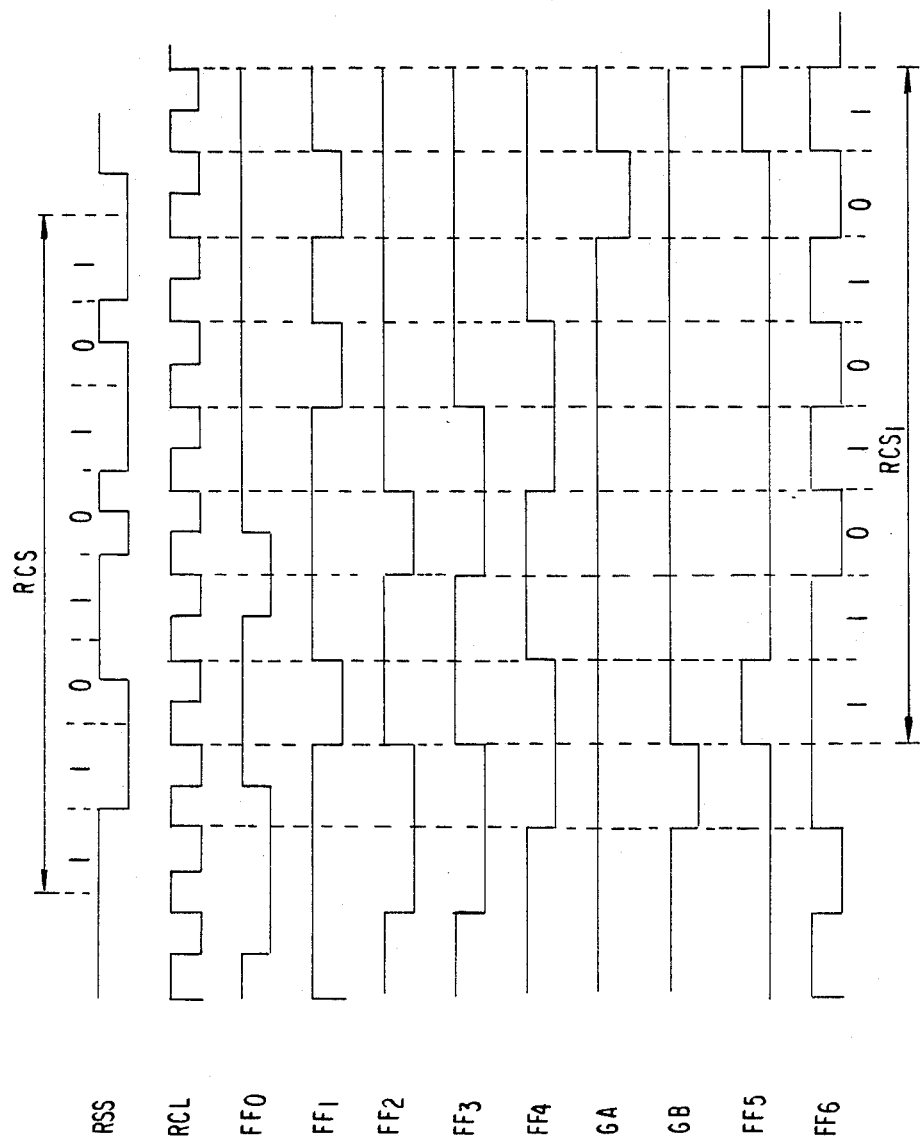
FIG. 9 shows a time chart for use in describing operation of the decoder illustrated in FIG. 8.

Referring to FIGS. 8 and 9 afresh together with FIG. 1, the particular second optical signal sequence is reproduced by the opto-electro converter 41 into the reproduced electric signal sequence (depicted at RSS in FIG. 9) including a reproduction of the composite signal CS as a reproduced composite signal RCS. The opto-electro converter 41 produces a reproduced sequence RCL of clock pulses in a known manner, as depicted at RCL in FIG. 9.

The reproduced electric signal sequence RSS is delivered to the decoder 42 along with the reproduced clock pulse sequence RCL. The illustrated decoder 42 is operable to separate a received collision test signal RCTS from the remaining reproduced signal sequence which may be called a received data sequence and, therefore, depicted at RDATA.

More particularly, the decoder 42 comprises first through seventh decoder flip flops 101 to 107, first through fourth NAND gates 111 to 114, and two inverters (unnumbered). Let the reproduced signal sequence RSS include the reproduced composite signal RCS combined with the synchronizing signal SYNC and subjected to the coded mark inversion in the above-mentioned manner, as illustrated in FIG. 9. The reproduced composite signal RCS has therefore a specific pattern of "11010101," like the composite signal CS illustrated in FIG. 5. Responsive to the reproduced signal sequence RSS and the reproduced clock pulse sequence RCL, the first decoder flip flop 101 produces first flip flop signal $FF_0$ as shown in FIG. 9. The reproduced signal sequence RSS is sent through the inverter to the second decoder flip flop 102 operated in response to an inversion of the reproduced clock pulse sequence RCL. The second decoder flip flop 102 supplies the fourth decoder flip flop 104 with a second flip flop signal $FF_1$ as shown at $FF_1$ in FIG. 9. Supplied with the first flip flop signal $FF_0$, the third decoder flip flop 103 produces a third flip flop signal depicted at $FF_3$ in FIG. 9 in response to the inverted and reproduced clock pulse sequence. The fourth decoder flip flop 104 produces a fourth flip flop signal as depicted at $FF_3$ in FIG. 9 in response to the second and the third flip flop signals $FF_1$ and $FF_2$. Timed by the inverted and reproduced clock pulse sequence, the fifth decoder flip flop 105 produces a fifth flip flop signal as depicted at $FF_4$ in response to the fourth flip flop signal $FF_3$. The first NAND gate 111, which is connected to the second and the fifth decoder flip flops 102 and 105 as illustrated in FIG. 8, supplies a first gated signal shown at GA in FIG. 9 to the third NAND gate 113. The second NAND gate 112, which is connected to the third and the fifth decoder flip flops 103 and 105, supplies a second gated signal (shown at GB) to the third NAND gate 113. The first and the second gated signals GA and GB are sent through the third NAND gate 113 to the sixth decoder flip flop 106. As a result, the sixth decoder flip flop 106 produces a sixth flip flop signal depicted at $FF_5$.

It is readily understood that the sixth flip flop signal $FF_5$ is equivalent to the collision test signal CTS inserted, as shown in FIG. 9. Accordingly, the sixth flip flop signal $FF_5$ is produced as the reproduced collision test signal RCTS.

In addition, the second and the third flip flop signal $FF_1$ and $FF_2$ are sent through the fourth NAND gate 114 to the seventh decoder flip flop 107. As readily understood from FIG. 9, the seventh decoder flip flop 107 produces a seventh flip flop signal $FF_6$ as shown at $FF_6$ in FIG. 9. The seventh flip flop signal $FF_6$ includes the same specific pattern as the reproduced signal sequence RCS, as indicated at $RCS_1$. This means that the reproduced signal sequence subjected to the coded mark inversion is favorably decoded by the decoder 42.

Figure 10:
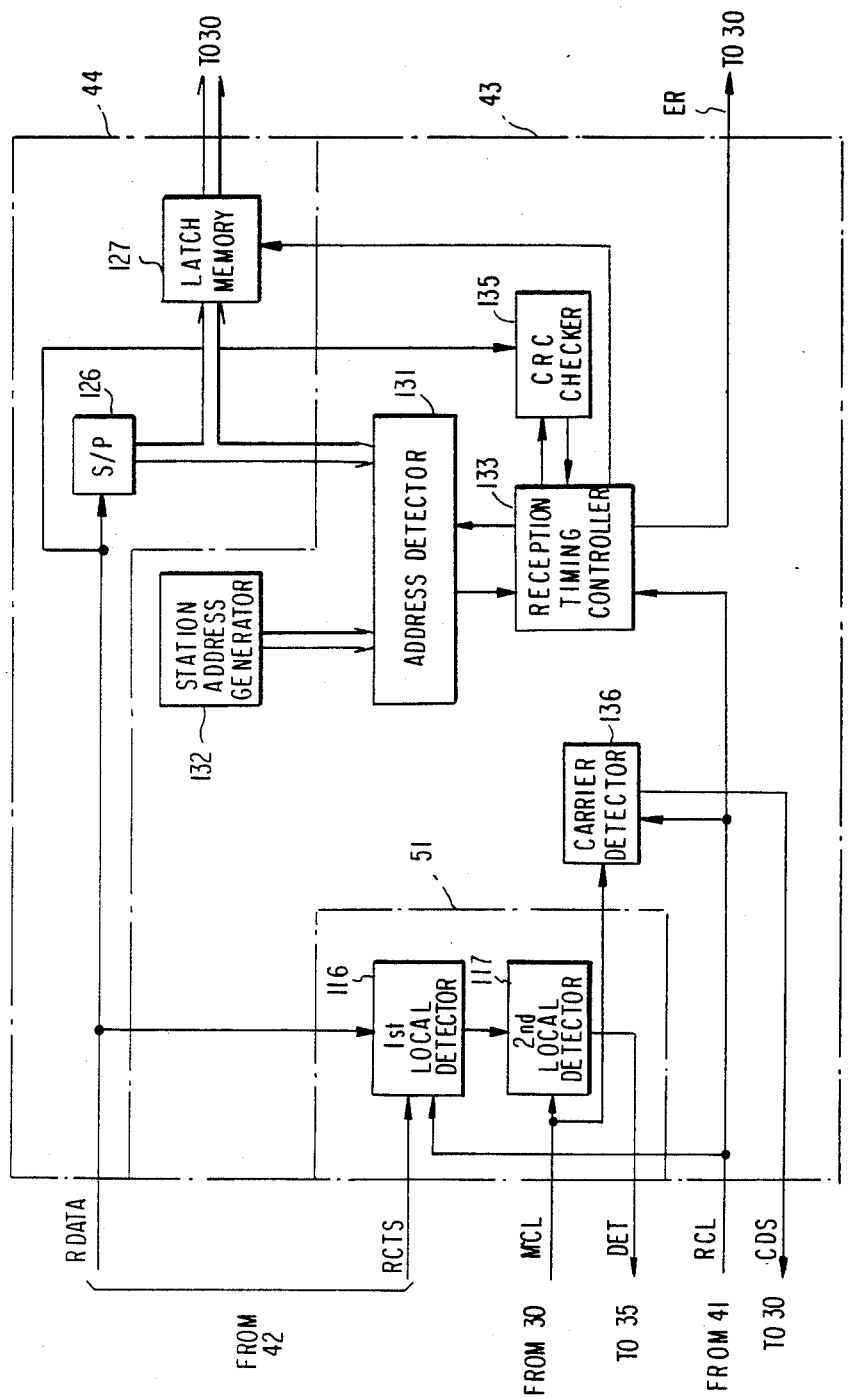
FIG. 10 shows a block diagram of a portion of the receiver section illustrated in FIG. 1 without the decoder illustrated in FIG. 8.

Referring to FIG. 10 anew together with FIGS. 1 and 8, the received collision test signal RCTS is supplied to the collision test signal detector 51 while the received data signal RDATA is sent to the serial-to-parallel conversion circuit 44.

Temporarily referring to FIG. 6 again together with FIG. 10, the collision test signal detector 51 comprises a first local detector 116 and a second local detector 117. The first local detector 116 is operable in response to the received data signal RDATA and the received collision test signal RCTS to detect whether a first pattern "11010101" specified by the received data signal RDATA appears simultaneously with a second pattern "10000001" specified by the received collision test signal RCTS with reference to the reproduced clock pulse sequence RCL sent from the opto-electro converter 41 (FIG. 1). In order to carry out such operation, the first local detector 116 comprises first and second shift registers 118 and 119 (FIG. 6) for successively storing the received data signal RDATA and the received collision test signal RCTS, respectively, and first and second logic circuits 121 and 122 coupled to the first and the second shift registers 118 and 119 for detecting the first and the second patterns, respectively. Anyway, when both of the first and the second patterns are concurrently detected by the first and the second logic circuits 121 and 122, a detection flip flop 123 is put into a set state to produce a reception signal REC representative of reception of the collision test signal CTS transmitted from the transmitter section 32. The reception signal REC is sent to the second local detector 117 to be kept in a latch flip flop 124. As a result, the detection signal DET is supplied from the latch flip flop 124 to the flip flop 88 (FIG. 6) included in the recognizer 88 when both of the first and the second patterns concurrently appear.

In FIG. 10, the received data signal RDATA is sent to the serial-to-parallel (S/P) converter 126 of the conversion circuit 44 in a normal reception mode and is converted into a succession of parallel data signals. Each parallel data signal is delivered to a latch memory 127 to be stored therein and to the reception controller 43 to be processed in a manner to be described below.

The reception controller 43 receives each of the parallel data signals at an address detector 131 to which the station address assigned to the communication station 21a is given as an assigned station address signal from a station address generator 132 similar to that illustrated in FIG. 4. The address detector 131 is controlled by a reception timing controller 133 operated in response to the reproduced clock pulse sequence RCL and checks whether or not the assigned station address is coincident with a received destination address carried by the received data signal RDATA. On detection of incoincidence between the assigned station and the received destination addresses, the incoincidence is reported to the reception timing controller 133 to make the controller stop operation of the latch memory 127. On the other hand, the received data signal is successively stored in the latch memory 127 on detection of coincidence between the assigned station address and the received destination address under control of the reception timing controller 133.

Responsive to the received data signal RDATA, a cyclic redundancy check (CRC) checker 135 carries out cyclic redundancy check in a known manner to detect presence or absence of an error or errors and to supply the reception timing controller 133 with a result signal representative of a result of the check. When any error is detected by the CRC checker 135, the reception timing controller 133 informs the main control unit 30 of occurrence of the error by procucing an error signal ER.

The reception controller 43 comprises a carrier detector 136 supplied with the main clock pulse sequence MCL from the main control unit 30 and with the reproduced clock pulse sequence RCL from the electro-opto converter 41. With reference to the main and the reproduced clock pulse sequences MCL and RCL, the carrier detector 136 detects whether or not the particular second optical train is received through the reception optical fiber cable 26a. The carrier detector 136 supplies the main control unit 30 with a carrier detection signal CDS representative of a result of the detection.

Figure 11:
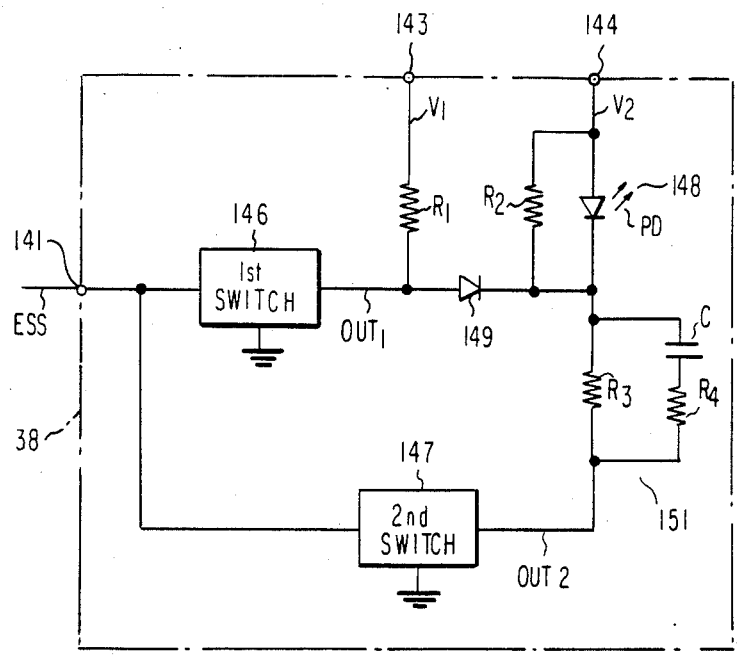
FIG. 11 shows a circuit diagram of an electro-opto converter illustrated in FIG. 1.
Figure 12:
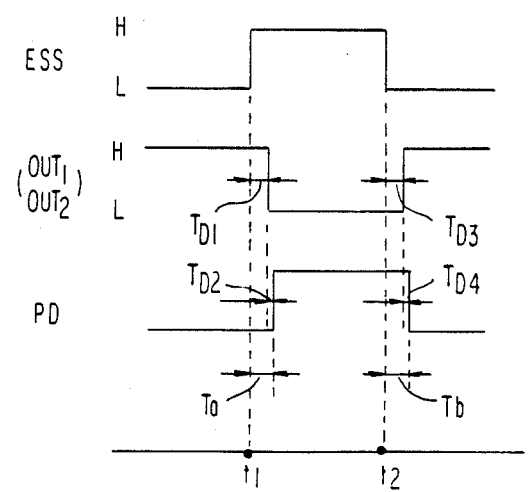
FIG. 12 shows a time chart for use in describing operation of the electro-opto converter illustrated in FIG. 11.

Referring to FIGS. 11 and 12, the electro-opto converter 38 is for use in converting the electric encoded signal sequence ESS (FIG. 1) into the first optical signal train shown at PD in FIGS. 11 and 12. Each signal of the encoded signal sequence takes a logic "1" level or a logic "0" level. Let the logic "1" and "0" levels be specified by a high and a low level, respectively. Each signal of the encoded signal sequence will simply be called an input signal for the time being.

The electro-opto converter 38 has a converter input terminal 141 for the input signal ESS, a first source terminal 143 to be connected to a first power source (not shown) for providing a first voltage indicated at $V_1$, and a second source terminal 144 to be connected to a second power source (not shown also) for providing a second voltage indicated at $V_2$. The second voltage $V_2$ is lower than the first voltage $V_1$.

The illustrated electro-opto converter 38 comprises first and second switches 146 and 147. The first switch 146 has a first input terminal (unnumbered) connected to the converter input terminal 141 and a first output terminal coupled to the first source terminal 143 through a first resistor $R_1$. A first output signal $OUT_1$ is produced through the first output terminal in response to the input signal ESS. The second switch 147 has a second input terminal connected to the first input terminal and a second output terminal so as to produce a second output signal $OUT_2$ through the second output terminal in response to the input signal ESS.

Each of the first and the second switches 146 and 147 may be a TTL (transistor transistor logic) NAND gate or a TTL inverter gate well known in the art. Preferably, each gate is of an open collector type. Such a gate may be μPB7438 or μPB7406 manufactured and sold by NEC Corporation, Tokyo, Japan.

The converter 38 comprises a light emitting diode 148 having a first anode and a first cathode and a diode 149 having a second anode and a second cathode. The first anode and the first cathode are connected to the second source terminal 144 and the second cathode, respectively. The second anode is connected to the first output terminal. A second resistor $R_2$ is connected in parallel to the light emitting diode 148 while a third resistor $R_3$ is connected between the first cathode and the second output terminal. The third resistor $R_3$ is shunted by a peaking circuit 151 having a series connection of a capacitor C and a fourth resistor $R_4$.

Let a single pulse be given as the input signal ESS through the converter input terminal 141, as exemplified in FIG. 12. The single pulse has leading and trailing edges which build up and down at first and second time instants $t_1$ and $t_2$, respectively. The single pulse takes the high (H) level during a time interval between the first and the second time instants $t_1$ and $t_2$. The first and the second switches 146 and 147 are simultaneously turned on a first delay time $T_{D1}$ after the first time instant $t_1$. In this event, the first switch 146 is supplied with a first electric current from the first source terminal 143 through the first resistor $R_1$ while the second switch 147 is supplied with a second electric current from the second source terminal 144 through the light emitting diode 148 and the third resistor $R_3$. As a result, each of the first and the second output signals $OUT_1$ and $OUT_2$ takes the low (L) level, as shown in FIG. 12.

When put into an on-state, the second switch 147 drives the light emitting diode 148. The light emitting diode 148 begins to emit light a second delay time $T_{D2}$ after the second switch 147 is turned on. The third resistor $R_3$ serves to restrict the second electric current to a favorable value. Thus, the light emitting diode 148 is rendered on after lapse of a first transmission duration Ta equal to a sum of the first and the second delay times $T_{D1}$ and $T_{D2}$. The second electric current is intercepted by the diode 149 and is therefore not caused to flow through the first switch 146.

When the pulse is extinct at the second time interval $t_2$, each of the first and the second output signals $OUT_1$ and $OUT_2$ is changed to the high (H) level a third delay time $T_{D3}$ after the second time instant $t_2$. The light emitting diode 148 is put into an extinction state when a fourth delay $T_{D4}$ lapses after transition of the second output signal $OUT_2$. In other words, the light emitting diode 148 is rendered off after lapse of a second transition duration Tb equal to a sum of the third and the fourth delay times $T_{D3}$ and $T_{D4}$.

With this structure, it is possible to considerably shorten each of the first and the second transition durations Ta and Tb as compared with a conventional converter comprising a single switch. More particularly, the first transition duration Ta can be shortened because the second delay time $T_{D2}$ is reduced by virtue of the peaking circuit 151. Stated otherwise, the peaking circuit 151 is helpful to render the light emitting diode 148 into the on-state.

Inasmuch as the first voltage $V_1$ is higher than the second voltage $V_2$, as mentioned before, the light emitting diode 148 is supplied with an inverse bias voltage from the first electric source through the diode 149 when the first switch 146 is rendered off. The inverse bias voltage serves to urge the light emitting diode 148 to become off. As a result, the second transition duration Tb can be shortened.

In addition, each of the first and the second switches may be constituted by a single NPN transistor, instead of the TTL gate.

Figure 13:
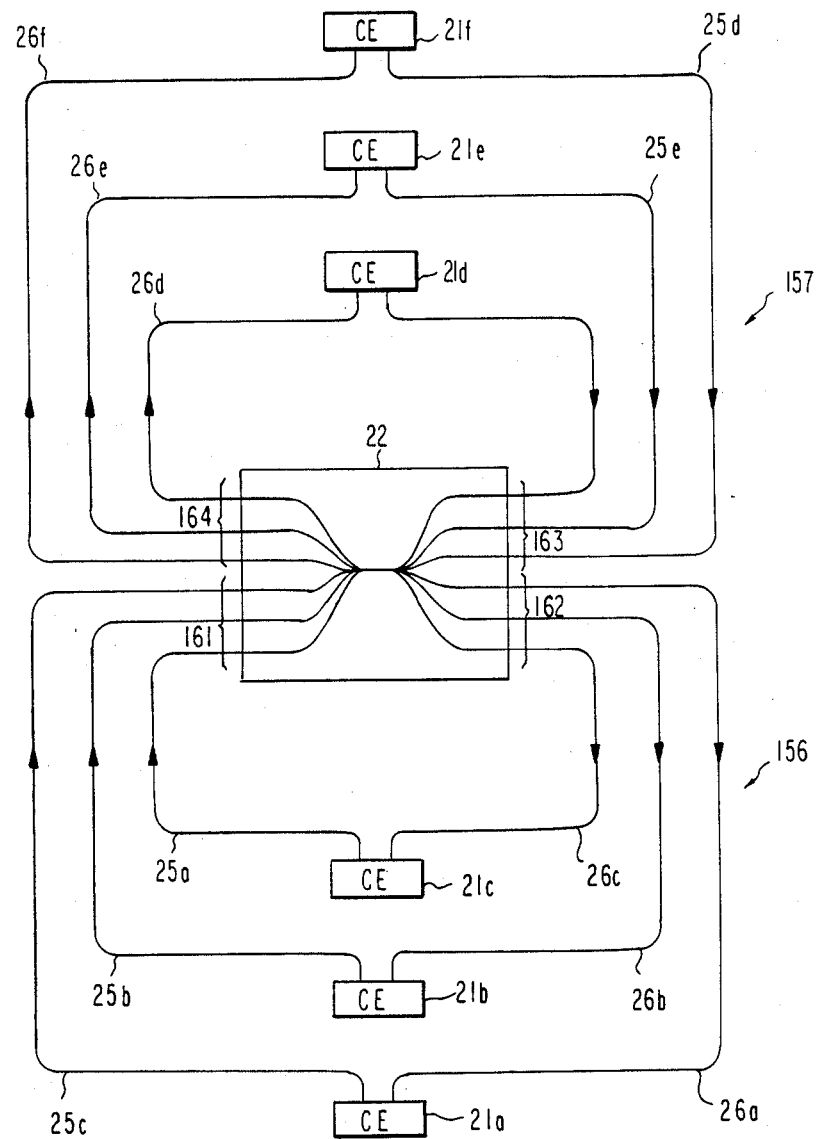
FIG. 13 shows a block diagram of an optical network system according to a second embodiment of this invention.

Referring to FIG. 13, an optical network system according to a second embodiment of this invention is similar to that illustrated in FIG. 1 except that the network system is divided into first and second subsystems 156 and 157 which are isolated from each other and that a single star coupler 22 is used in common to the first and the second subsystems 156 and 157. More specifically, the transmission optical fiber cables 25a, 25b, and 25c and the reception optical fiber cables 26a, 26b, and 27c of the communication stations 21a, 21b, and 21c are connected to a first input terminal group 161 and a first output terminal group 162 which are shown on the lefthand and the righthand sides of the star coupler 22, respectively. On the other hand, the transmission optical fiber cables 25d, 25e, and 25f and the reception optical fiber cables 26d, 26e, and 26f of the second subsystem 157 are connected to a second input terminal group 163 and a second output terminal group 164 which are shown on the righthand and the lefthand sides of the star coupler 22, respectively. Each of the first and the second input terminal groups 161 and 163 may be called a first set of terminals while each of the first and the second output terminal groups, a second set of terminals.

Inasmuch as bidirectional transmission is possible by the use of the star coupler 22, two of the subsystems 156 and 157 can carry out communication among each group of the communication stations by transmitting optical signal trains in opposite directions to each other, as readily understood from FIG. 13. In this event, the subsystems 156 and 157 use the star coupler 22 as common transmission paths, respectively. It is needless to say that each transmitter section of the communication stations is coupled to each transmission optical fiber cable 25a–25f while each receiver section is connected to each reception optical fiber cable 26a–26f.

Each of the communication stations 21a to 21f has the same structure as that illustrated with reference to FIGS. 1 to 10. Therefore, collision can rapidly be detected in each communication station.

Figure 14:
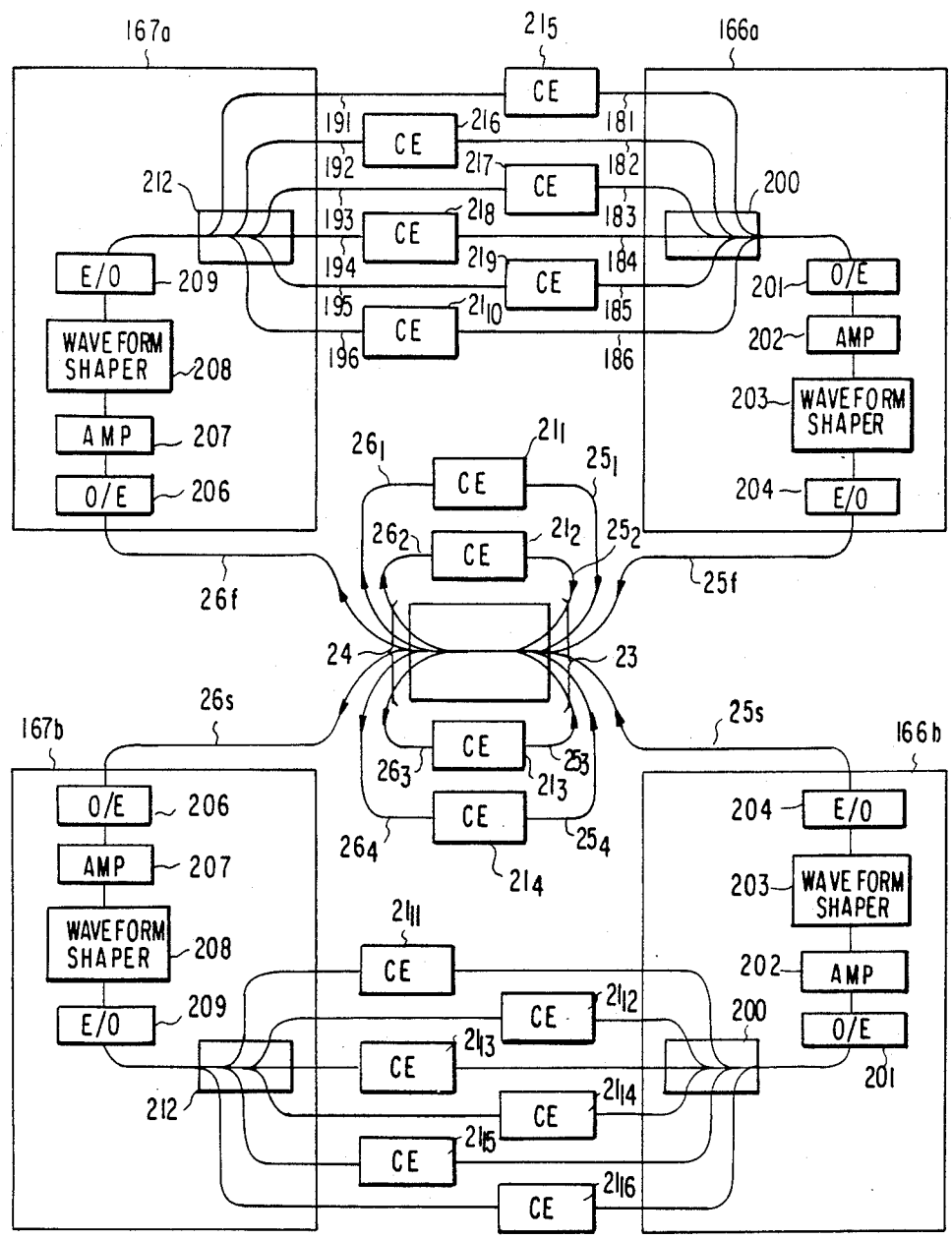
FIG. 14 shows a block diagram of an optical network system according to a third embodiment of this invention.

Referring to FIG. 14, an optical network system according to a third embodiment of this invention comprises a single star coupler 22 having six terminals of a first set 23 and six terminals of a second set 24, like in FIG. 1. The illustrated system comprises communication stations, namely, communication equipments (CE) which are greater in number than six and which are denoted by $21_1$ to $21_{16}$. Each of the communication stations 21 (suffixes omitted) is similar in structure and operation to that illustrated with reference to FIGS. 1 through 10. Thus, the communication stations 21 are equal in number to sixteen in the example being illustrated and therefore may be first through sixteenth communication stations, respectively. The communication stations 21 are divisible into a first group connected direct to the star coupler 22 and a second group connected indirect thereto. The first group consists of four of the first through the fourth communication stations $21_1$ to $21_4$ while the second group, the remaining communication stations $21_5$ to $21_{16}$.

The first through the fourth communication stations $21_1$ to $21_4$ of the first group are connected to the star coupler 22 through transmission optical fiber cables denoted by $25_1$ to $25_4$ and through reception optical fiber cables $26_1$ to $26_4$, respectively.

The fifth through the sixteenth communication stations $21_5$ to $21_{16}$ of the second group are subdivided into a first and a second subgroup consisting of the fifth through the tenth communication stations and the eleventh through the sixteenth ones, respectively. The first subgroup is connected to the star coupler 22 through a first concentrator 166a and a first transmission optical fiber cable (denoted by 25f) connected to one of the first-set terminals 23 and through a first distributor 167a and a first reception optical fiber cable (denoted by 26f) connected to one of the second-set terminals 24. Likewise, the second subgroup is connected to the star coupler 22 through a second concentrator 166b and a second transmission optical fiber cable 25s and through a second distributor 167b and a second reception optical fiber cable 26s. The second concentrator 166b and the second distributor 167b are similar to the first concentrator 166a and the first distributor 167a, respectively. Connection between the second subgroup and each of the second concentrator 166b and the second distributor 167b are also similar to those between the first subgroup and each of the first concentrator 166a and the first distributor 167a. Therefore, description will be made about the first subgroup, the first concentrator 166a, and the first distributor 167a alone.

The fifth through the tenth communication stations $21_5$ to $21_{10}$ are connected to the first concentrator 166a through first to sixth local transmission optical fibers 181 to 186, respectively, and also to the first distributor 167a through first through sixth local reception optical fibers 191 to 196, respectively. Each transmission optical signal train is sent to the first concentrator 166a from the first-subgroup communication stations through the first through the sixth local transmission optical fibers 181 to 186 while each reception optical signal train is distributed to the respective first-subgroup communication stations through the first through the sixth local reception optical fibers 191 to 196.

The first concentrator 166a comprises a first optical coupler 200 having six input terminals connected to the first through the sixth local transmission optical fibers 181 to 186, respectively, and a single output terminal connected to an opto-electro (O/E) converter 201. Each transmission optical signal train which is sent from the first-subgroup communication stations is given to the opto-electro converter 201 through one of the six input terminals of the optical coupler 200 and the single output terminal thereof. The opto-electro converter 201 converts each transmission optical signal train into an electric signal train which is sent through a first amplifier 202 and a first waveform shaper 203 to a first electro-opto (E/O) converter 204. Thus, the electric signal train is converted into an optical signal train again by the electro-opto converter 204 to be sent to the star coupler 22 through the first transmission optical fiber cable 25f.

The first distributor 167a comprises a second opto-electro (O/E) converter 206 responsive to a transmission optical signal train given through the first reception optical fiber cable 26f. The second opto-electro converter 206 converts the reception optical signal train into an electric signal train which is sent through a second amplifier 207 and a second waveform shaper 208 to a second electro-opto (E/O) converter 209. The electric signal train is converted into an optical signal train again by the second electro-opto converter 209 to be supplied to a second optical coupler 212 having a single input terminal and six output terminals. The optical signal train converted by the second electro-opto converter 209 is sent from the single input terminal of the second optical coupler 212 to the six output terminals thereof to be delivered to the first-subgroup communication stations $21_5$ to $21_{10}$ through the first through the sixth local reception optical fibers 191 to 196.

The transmission optical signal train given through the first reception optical fiber cable 25f is delivered to the second-subgroup communication stations $21_{11}$ to $21_{16}$ through the second distributor 167b in the above-mentioned manner and is delivered also direct to the first through the fourth communication stations $21_1$ to $21_4$.

Thus, it is readily understood that each transmission optical signal train transmitted from the second-group communication stations $21_5$ to $21_{16}$ is distributed to all of the communication stations, as is the case with the first-group communication stations $21_1$ to $21_4$.

As suggested before, each communication station $21_1$ to $21_{16}$ can produce the collision test signal CTS of the type described with reference to FIGS. 1 to 10. Let the collision test signal CTS be produced from a specific one of the second-group communication stations. The collision test signal CTS is returned back to the specific communication station through the concentrator, the star coupler 22, and the distributor before the acknowledge character is sent back to the specific communication station from a destination station. This means that collision can rapidly be detected by the specific communication station, like in FIGS. 1 through 10.

Anyway, the first and the second concentrators 166a and 166b and the first and the second distributors 167a and 167b serve as an intermediate system between the star coupler 22 and the second-group communication stations $21_5$ to $21_{16}$ together with the local optical fibers 181 to 186 and 191 to 196.

All elements in each of the concentrators and the distributors may be those known in the art and are therefore described no longer. In addition, each of the first and the second electro-opto converters 204 and 209 may be the electro-opto converter illustrated with reference to FIGS. 11 and 12.

Figure 15:
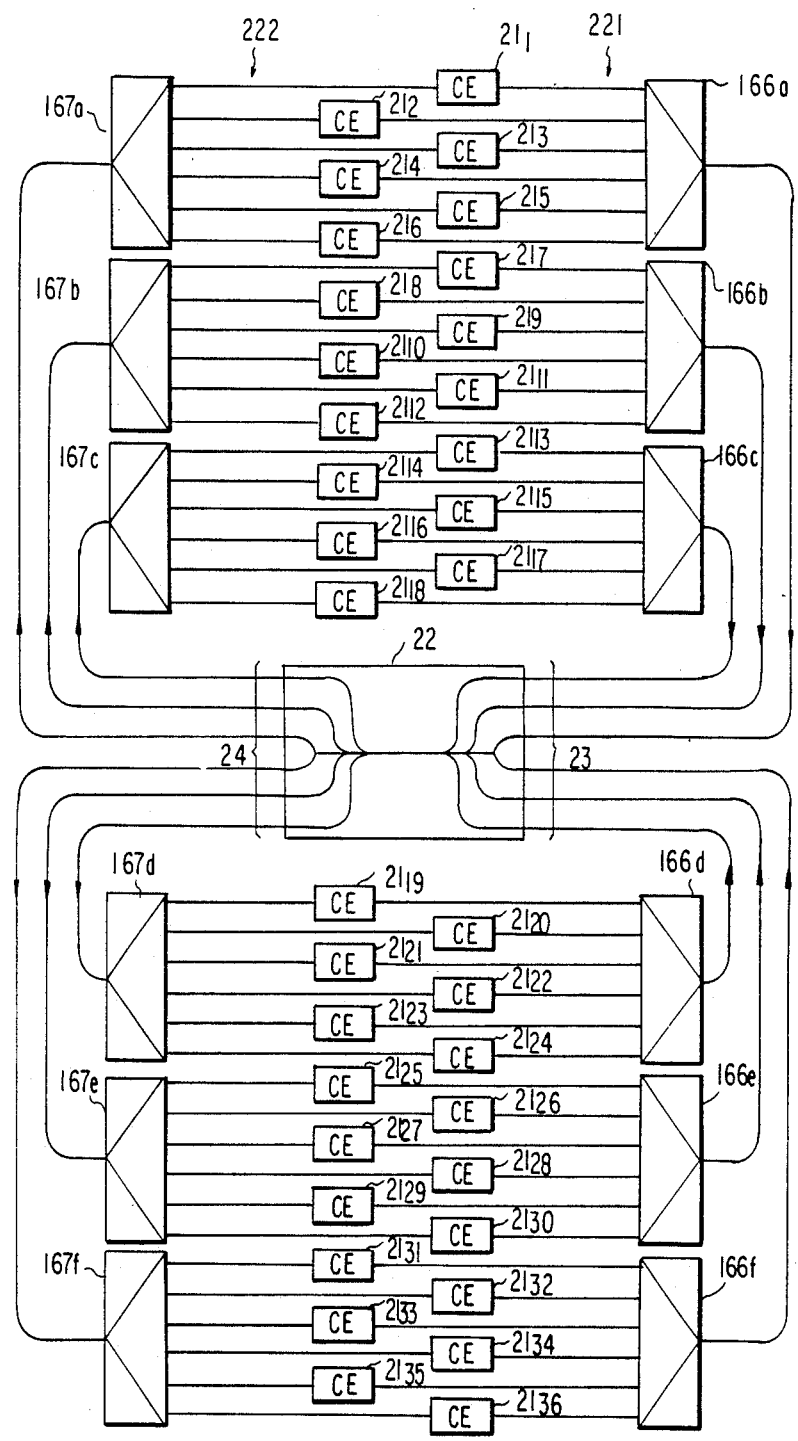
FIG. 15 shows a block diagram of an optical network system according to a fourth embodiment of this invention.

Referring to FIG. 15, an optical network system according to a fourth embodiment of this invention comprises a single star coupler 22 of a passive type having six input terminals of a first set 23 and six output terminals of a second set 24, like in FIG. 14. The system is for coupling to the star coupler 22 thirty-six communication station (denoted by $21_1$ to $21_{36}$) which are divided into first through sixth sets each of which consists of six communication stations. The first-through the sixth-set communication stations are connected to the first-set terminals 23 of the star coupler 22 through first to sixth concentrators (denoted by 166a, 166b, 166c, 166d, 166e, and 166f), respectively, and to the secondset terminals 24 through first to sixth distributors (denoted by 167a, 167b, 167c, 167d, 167e, and 167f), respectively. Thus, all of the communication stations illustrated in FIG. 15 are connected indirect to the star coupler 22 and may therefore be called the second group described with reference to FIG. 14. In other words, a first group connected direct to the star coupler 22 consists of no communication station in the example illustrated in FIG. 15.

Each of the first through the sixth concentrators 166a to 166f has six input terminals and a single output terminal and is similar in structure to each of the first and the second concentrators 166a and 166b illustrated in FIG.

14. Likewise, each of the first through the sixth distributors 167a to 167f is similar in structure to each distributor illustrated in FIG. 14.

The communication stations of each set are connected through local transmission and reception optical fibers (collectively shown at 221 and 222) to each concentrator and distributor for each set, respectively.

Each of the illustrated communication stations is similar in structure and operation to that illustrated in conjunction with FIGS. 1 to 10 and carries out communication among the communication stations in the manner described with reference to FIG. 14. Therefore, collision can be detected by each station, like in FIGS. 1 to 10.

Figure 16:
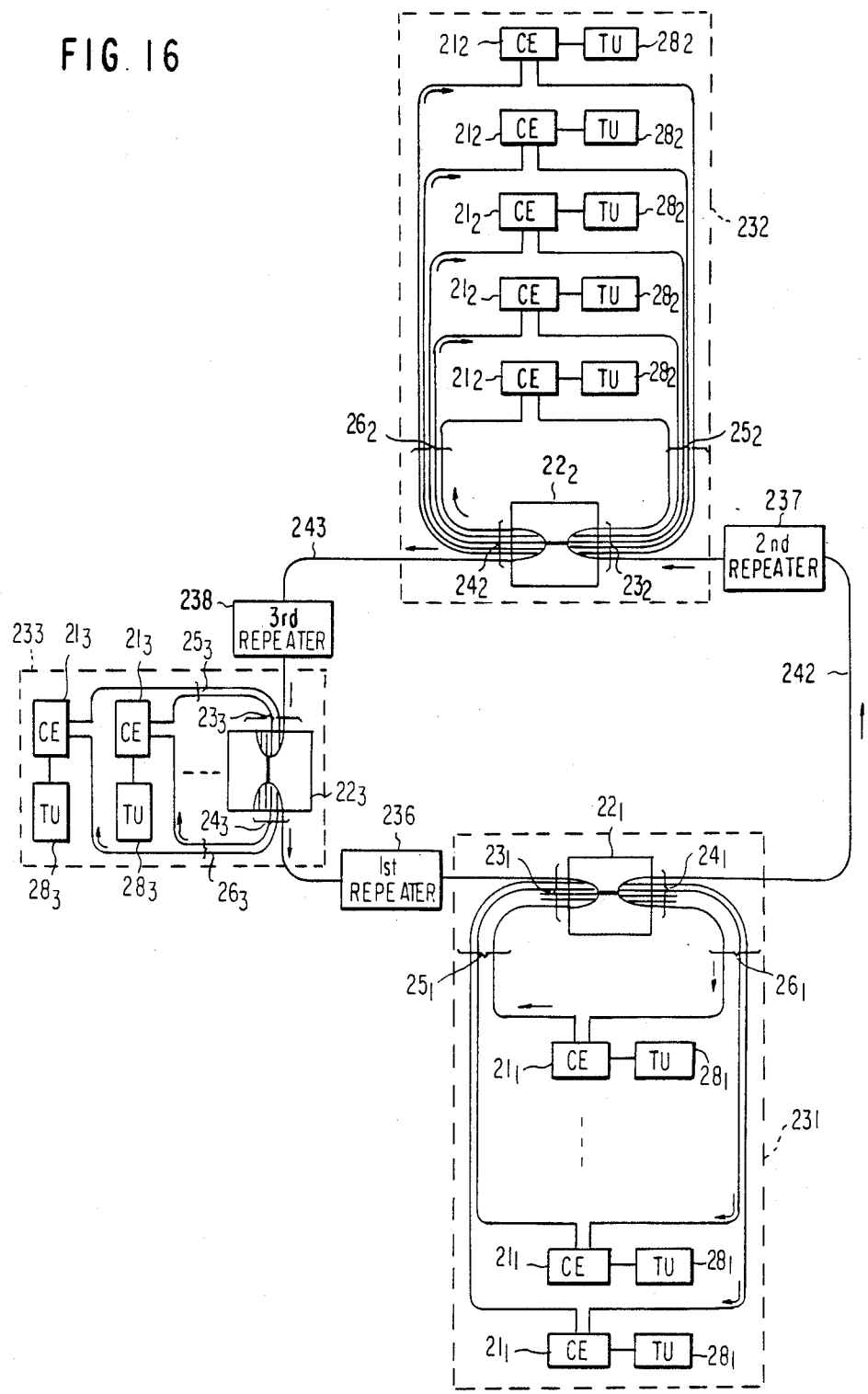
FIG. 16 shows a block diagram of an optical network system according to a fifth embodiment of this invention.

Referring to FIG. 16, an optical network system according to a fifth embodiment of this invention comprises first, second, and third network units 231, 232, and 233 each of which comprises a single star coupler 22 having a first set 23 of terminals and a second set 24 of terminals. The star couplers in the first through the third network units 231 to 233 may be called first, second, and third star couplers, respectively. The first through the third network units 231 to 233 will be specified by suffixes 1, 2, 3 attached to the reference symbols, such as $22_1$, $22_2$, and $22_3$. Each network unit comprises a plurality of communication stations 21 coupled to the star coupler 22 of each network unit, and a plurality of terminal units 28 connected to the communication stations 21. The respective communication stations 21 are similar in structure and operation to that illustrated with reference to FIGS. 1 through 10. It is therefore possible for each communication station to detect collision by the use of the collision test signal generator 50 and the collision test signal detector 51 both of which are illustrated in FIG. 1.

The communication stations 21 are connected to the star coupler 22 of each of the first through the third network units 231 to 233 through transmission and reception optical fiber cables 25 and 26 respectively.

It is mentioned here that all of the communication stations 21 are divisible in a first group consisting of the communication stations $21_1$ included in the first network unit 231 and a second group consisting of the remaining communication stations. The second-group communication stations are subdivided into first and second subgroups accommodated in the second and the third network units 232 and 233, respectively.

First, second, and third repeaters 236, 237, and 238 are linked between the third and the first star couplers $22_3$ and $22_1$, between the first and the second star couplers $22_1$ and $22_2$, and between the second and the third star couplers $22_2$ and $22_3$ through first, second, and third interconnection optical fiber cables 241, 242, and 243, respectively. Thus, the illustrated network system is of a loop shape.

In such a loop-shaped system, let one of the first-group communication stations $21_1$ produce a transmission optical signal train through one of the transmission optical fiber cables $25_1$. The transmission optical signal train is delivered through the first star coupler $22_1$ to the respective communication stations $21_1$ of the first group and sent to the second coupler $22_2$ through the second interconnection optical fiber cable 242 and the second repeater 237. The second coupler $22_2$ delivers the transmission optical signal train in question to the communication stations $22_2$ included in the second network unit 232 and also to the third star coupler $23_3$ through the third interconnection optical fiber cable 243 and the third repeater 238. The transmission optical signal train is distributed to the respective communication stations $22_3$ of the third network unit 233 through the reception optical fiber cables $26_3$ and to the first star coupler 231 through the first repeater 236 and the first interconnection optical fiber cable 241. The transmission optical signal train which is returned back to the first network unit 231 is delivered to the communication stations $21_1$ of the first network unit 231. Thus, the transmission optical signal train objectionably circulates in the network system. This is true of each transmission optical signal train supplied from the other communication stations.

The illustrated optical network system is for avoiding the objectionable circulation of each optical signal train.

Figure 17:
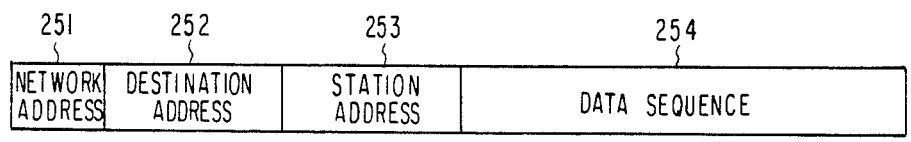
FIG. 17 shows a signal format of an optical signal train for use in describing operation of the optical network system illustrated in FIG. 16.

Referring to FIG. 17 afresh together with FIG. 16, a transmission optical signal train which is produced by each communication station 21 comprises a network address 251 assigned to each of the first through the third network units 231 to 233, a destination address 252 specifying a destination station, a station address 253 assigned to each communication station, and a transmission data sequence 254 following the station address. The network address 251 may be called a group address because each of the first group and the second group subdivided into the first and the second subgroups can be specified by this address. The station address generator 77 illustrated in FIG. 4 can be used to produce a network address signal representative of the network address 251 together with the station address signal. A combination of the respective addresses and the data sequence is preceded by the synchronizing signal and the collision test signal like in FIG. 2 as a specific data signal and is sent through the star coupler to each of the first to the third repeaters 231 to 233 in the form of a packet. Herein, let the above-mentioned transmission optical signal train be transmitted as a particular optical signal train from a particular one of the communication stations $21_1$ included in the first network unit 231 to a destination station included in the third network unit 233. In this event, the network, the destination, and the station addresses specify the first network unit, the destination station included in the third network 233, and the particular station included in the first network unit 231, respectively. The network address assigned to the first network unit may be called a first network address.

Figure 18:
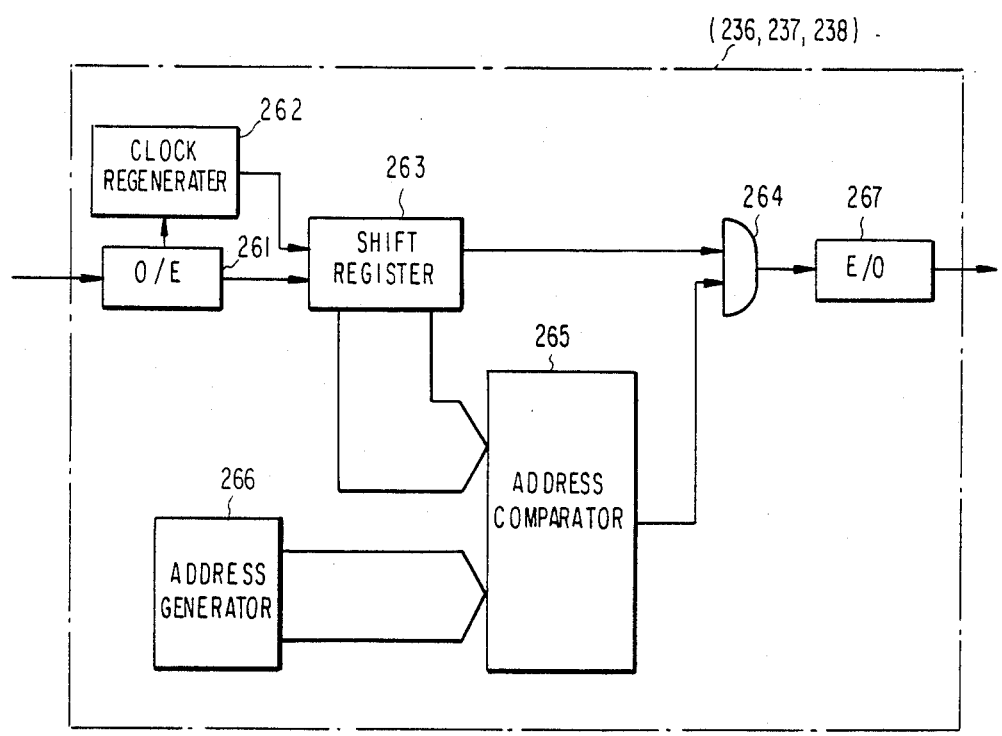
FIG. 18 shows a block diagram of each repeater for use in the optical network system illustrated in FIG. 16.

Referring to FIG. 18 afresh together with FIGS. 16 and 17, the particular optical signal train is delivered through the first star coupler $22_1$ to the respective communication stations $21_1$ of the first network unit 231. As a result, the particular communication station can rapidly detect collision by the use of the collision test signal in the manner mentioned before. The particular optical signal train is also delivered to the second repeater 237.

In FIG. 18, an opto-electro (E/O) converter 261 in the second repeater 237 converts the particular optical signal train into an electric signal train which is sent to a clock generator 262 and a shift register 263 having a plurality of stages. The clock regenerator 262 reproduces a sequence of reception clock pulses in response to the electric signal train in a known manner to supply the reception clock pulse sequence to the shift register 263. The electric signal train is successively stored and shifted in the shift register 263 in accordance with the reception clock pulses to be successively sent to an AND gate 264.

Simultaneously, the shift register 263 sends the stored electric signals of the respective stages to an address comparator 265 in a bit parallel fashion. The address comparator 265 is connected to an address generator 266.

In case of the second repeater 237, the address generator 266 produces a network address identification signal specifying a second network address assigned to the second network unit 232.

Inasmuch as the particular optical signal train carries the first network address, the address comparator 265 detects no coincidence between both of the network addresses which are specified by the idenfication signal and the particular optical signal train to supply an enable signal to the AND gate 264. As a result, the particular electric signal train is allowed to pass through the AND gate 264 and is sent to an electro-opto converter 267. The electro-opto converter 267 converts the particular electric signal train into an optical signal train which is repeated by the second repeater 237 and may therefore be called a particular optical signal train again.

Thus, the particular optical signal train is supplied from the second repeater 237 through the second star coupler $22_2$ to the respective communication stations $22_2$ of the second network unit 232 and to the third repeater 238, as shown in FIG. 16. The third repeater 238 is similar in operation to the second repeater 237 except that the address generator 266 generates the second network address as the network address identification signal. Therefore, the particular optical signal train is again repeated by the third repeater 238 to be sent to the respective communication station $22_3$ of the third network unit 233 and to be received at the destination station.

The particular optical signal train is also sent to the first repeater 236 wherein the address generator 266 generates the first network address as the network address identification signal. Therefore, the address comparator 265 in the first repeater 236 detects coincidence between both of the network addresses which are specified by the particular optical signal train and the network address identification signal. As a result, the AND gate 264 is disabled to intercept the particular electric signal train. Therefore, the particular optical signal train is never returned back to the first network unit 231. Objectionable circulation can thus be avoided.

Although the first through the third network units 231 to 233 are linked to one another in FIG. 17, only two network units may be connected to each other through a pair of repeaters each of which generates a network, namely, a group address assigned to a network following each repeater. At any rate, a combination of the repeaters, the star couplers except the first coupler $22_1$ is operable to an intermediate circuit between the first and the second groups of communication stations, together with various optical fibers.

While this invention has thus far been described in conjunction with several embodiments thereof, it will readily be possible for those skilled in the art to put this invention into practice in various manners. For example, the electro-opto converter 267 illustrated in FIG. 18 may be constructed by that described in conjunction with FIGS. 11 and 12. Each terminal unit 28 illustrated in FIG. 17 may be a protocol converter to form a hierarchy structure. Such a protocol converter may be accommodated in each communication station shown in FIGS. 14 and 15. The collision test signal CTS may be substituted for the synchronizing signal without being mixed with the synchronizing signal and may not be encoded. The star coupler may be of an active type. The destination address may specify each terminal unit.

What is claimed is:

1. In a network system for use in optical transmission among a plurality of communication stations through a star coupler operable as a common transmission path, said star coupler being given first optical signal trains generated by the respective communication stations so as to distribute each of said first optical signal trains to all of said stations as second optical signal trains and to make a predetermined at least one of said plurality of communication stations receive one of said second optical signal trains, each of said first optical signal trains giving rise to collision with another on concurrent transmission of said first optical signal trains, the improvement wherein each of said communication stations comprises:

signal producing means for electrically producing a sequence of transmission signals including a specific data signal, said specific data signal to be used in detecting said collision on concurrent transmission;

sending means for sending transmission signal sequence to said star coupler as one of said first optical signal trains to make said star coupler deliver said specific data signal to said each communication station as a particular one of said second optical signal trains;

reproducing means responsive to said particular second optical signal train for electrically reproducing said transmission signal sequence into a reproduced signal sequence including a reproduction of said specific data signal as a received specific data signal; and collision detecting means responsive to said received specific data signal for detecting occurrence of said collision by monitoring said received specific data signal;

wherein said star coupler has a first set of terminals for the respective first optical signal trains and a second set of terminals for the respective second optical signal trains, said communication stations being divisible into a first group connected direct to said star coupler and a second group connected indirect to said star coupler, said first and said second groups consisting of first and second predetermined numbers of said communications stations, respectively, said system further comprising: intermediate means between said star coupler and said second group for connecting said second group to said star coupler to carry out said optical transmission among said communication stations through said intermediate means and said star coupler;

said intermediate means comprising first repeating means connected to a specific one of said first set of terminals for repeating the first optical signal trains given from said second group to supply said star coupler with said repeated first optical signal trains through said specific one of the first set of terminals, second repeating means connected to a preselected one of said second set of terminals for repeating a preselected one of said second optical signal trains given through a preselected one of said second set of terminals to produce said repeated second optical signal train as a preselected second optical signal train; and network means connected to said first and said second repeating means and said second group for delivering said preselected second optical signal train to both of said second group and said first repeating means and also for delivering to said first repeating means the first optical signal trains given from said second group;

said first repeating means comprising means for producing a first identification signal identical with a group address signal specifying said first group, and first delivering means responsive to a transmission signal sequence given from said network means for selectively delivering the above-mentioned transmission signal sequence to said star coupler only when said first identification signal is incoincident with the group address signal included in the above-mentioned transmission signal sequence; and said second repeating means comprising means for producing a second identification signal identical with the group address signal specifying said second group; and second delivering means responsive to the transmission signal sequence given through said specific one of said first set of terminals for selectively delivering the last-mentioned transmission signal sequence to said network means only when said second identification signal is incoincident with said second identification signal included in the last-mentioned transmission signal sequence; and wherein said signal producing means of said each communication station comprises specific data producing means for producing said specific data signal, data signal producing means for producing a data signal to be sent to a destination one of said communication stations, address producing means for producing a group address signal and a station address signal assigned to each of said groups and said each communication station, respectively, together with a destination address signal specifying said destination station, and means for producing a combination of said specific data signal, said group, said stations, and said destination address signals, and said data signal as said transmission signal sequence.

2. In a network system for use in optical transmission among a plurality of communication stations through a star coupler operable as a common transmission path, said star coupler being given first optical signal trains generated by the respective communication stations so as to distribute each of said first optical signal trains to all of said stations as second optical signal trains and to make a predetermined at least one of said plurality of communication stations receive one of said second optical signal trains, each of said first optical signal trains giving rise to collision with another on concurrent transmission of said first optical signal trains, the improvement wherein each of said communication stations comprises:

signal producing means for electrically producing a sequence of transmission signals including a specific data signal, said specific data signal to be used in detecting said collision on concurrent transmission, each signal of said transmission signal sequence selectively taking a logic "1" and a logic "0" level;

sending means for sending transmission signal sequence to said star coupler as one of said first optical signal trains to make said star coupler deliver said specific data signal to said each communication station as a particular one of said second optical signal trains;

reproducing means responsive to said particular second optical signal train for electrically reproducing said transmission signal sequence into a reproduced signal sequence including a reproduction of said specific data signal as a received specific data signal; and collision detecting means responsive to said received specific data signal for detecting occurrence of said collision by monitoring said received specific data signal;

wherein said sending means comprises conversion means for converting said transmission signal sequence into said first optical signal train, and wherein said conversion means comprises;

a first source terminal to be connected to a first power source for providing a first voltage;

a second source terminal to be connected a second power source for providing a second voltage lower than said second voltage;

first switching means having a first input terminal given said transmission signal sequence and a first output terminal coupled to said first source terminal for carrying out switching operation in response to the logic "1" and the logic "0" levels of each signal of said transmission signal sequence to produce a first output signal taking either one of the logic "1" and the logic "0" levels through said first output terminal;

second switching means having a second input terminal connected in common to said first input terminal and a second output terminal for carrying out switching operation in response to the logic "1" and the logic "0" levels to produce a second output signal taking either one of the logic "1" and the logic "0" levels through said second output terminal;

a light emitting element having an anode connected to said second source terminal and a cathode;

a diode connected between said first output terminal and said cathode; and a peaking circuit connected between said cathode and said second output terminal.

3. In a network system for use in optical transmission among a plurality of communication stations through a star coupler operable as a common transmission path, said star coupler receiving first optical signal trains generated by the respective communication stations so as to distribute each of said first optical signal trains to all of said stations as second optical signal trains, at least one of said stations receiving one of said second optical signal trains, each of said communication stations being individually communicable with the other stations through said star coupler, the improvement wherein each of said communication stations comprises:

signal producing means for electrically producing a sequence of transmission signals, each signal of said transmission signal sequence selectively taking a logic "1" and a logic "0" level; and conversion means for converting said transmission signal sequence into one of said first optical signal trains;

said conversion means comprising a first source terminal to be connected to a first power source for providing a first voltage;

a second source terminal to be connected to a second power source for providing a second voltage lower than said first voltage;

first switching means having a first input terminal given said transmission signal sequence and a first output terminal coupled to said first source terminal for carrying out switching operation in response to the logic "1" and the logic "0" levels of each signal of said transmission signal sequence to produce a first output signal taking either one of the logic "1" and the logic "0" levels through said first output terminal;

second switching means having a second input terminal connected in common to said first input terminal and a second output terminal for carrying out switching operation in response to the logic "1" and the logic "0" levels to produce a second output signal taking either one of the logic "1" and the logic "0" levels through said second output terminal;

a diode connected to said first output terminal;

a peaking circuit connected between said diode and said second output terminal; and a light emitting diode connected between said second source terminal and a point of connection between said diode and said peaking circuit for producing said one of the first optical signal train.

4. A network system for use in optical transmission among plural communication stations through a star coupler comprising:

a star coupler having a first set of terminals for first optical signal trains, respectively, and a second set of terminals for second optical signal trains, respectively;

a first plurality of communication stations each communication station of said first plurality of communication stations communicating with the other communication stations of said first plurality of communication stations through said star coupler;

a second plurality of communication stations each communication station of said second plurality of communication stations communicating with the other communication stations of said second plurality of communication stations through said star coupler;

wherein each communication station comprises specific data producing means for producing a specific data signal, data signal producing means for producing a data signal to be sent to a destination one of said communication stations, address producing means for producing a group address signal and a station address signal assigned to each of said first and second plurality of communication stations and each of said communication stations, respectively, and a destination address signal specifying a destination address, and means for supplying a combination of said specific data signal, said group, said station, and said destination address signals, and said data signal to a first intermediate means as a first optical signal train;

said first intermediate means comprising means for producing a first identification signal identical with the group address signal specifying said first plurality of communication stations, and first delivery means responsive to one of said first optical signal trains for delivering said one of said first optical signal trains to said star coupler only when said first identification signal is incoincident with the group address signal in said first optical signal train; and a second intermediate means comprising means for producing a second identification signal identical with the group address of said second plurality of communication stations, and second delivery means responsive to one of said second optical signal trains resulting from one of said first optical signal trains for delivering said one of said second optical signal trains to said second plurality of communication stations only when the second identification signal is incoincident with the group address signal in the second optical signal train.

* * * * *

UNITED STATES PATENT AND TRADEMARK OFFICE
CERTIFICATE OF CORRECTION

PATENT NO. : 4,723,309
DATED : February 2, 1988
INVENTOR(S) : MOCHIZUKI ET AL

It is certified that error appears in the above-identified patent and that said Letters Patent is hereby corrected as shown below:

| | |
|---|---|
| COLUMN 2, LINE 10 | After "data signal to" delete "the" |
| COLUMN 2, LINE 16 | After "as" insert --a-- |
| COLUMN 3, LINE 26 | After "star" insert -- - -- |
| COLUMN 6, LINE 6 | Delete "t" and insert --$\underline{t}$-- |
| COLUMN 6, LINE 9 | Delete "t" and insert --$\underline{t}$-- |
| COLUMN 6, LINE 11 | Delete "t" and insert --$\underline{t}$-- |
| COLUMN 7, LINE 50 | Delete "CK$_3$" and insert --CLK$_3$-- |
| COLUMN 7, LINE 55 | After "CLK$_1$" insert --and-- |
| COLUMN 19, LINE 11 | Delete "idenfication" and insert --identification-- |

Signed and Sealed this

Twenty-second Day of November, 1988

Attest:

DONALD J. QUIGG

*Attesting Officer*     *Commissioner of Patents and Trademarks*